United States Patent
Li et al.

(10) Patent No.: US 11,611,655 B2
(45) Date of Patent: Mar. 21, 2023

(54) SYSTEMS AND METHODS FOR PROCESSING CALLS

(71) Applicant: Comcast Cable Communications, LLC, Philadelphia, PA (US)

(72) Inventors: Chia-Chang Li, Holmdel, NJ (US); Vengatarajulu Rajasekar, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/370,736

(22) Filed: Jul. 8, 2021

(65) Prior Publication Data
US 2023/0012008 A1 Jan. 12, 2023

(51) Int. Cl.
*H04M 3/436* (2006.01)
*H04M 3/42* (2006.01)
*H04L 65/1104* (2022.01)

(52) U.S. Cl.
CPC ......... *H04M 3/436* (2013.01); *H04L 65/1104* (2022.05); *H04M 3/42034* (2013.01); *H04M 2203/6027* (2013.01)

(58) Field of Classification Search
CPC ............. H04M 3/436; H04M 3/42034; H04M 2203/6027; H04L 2203/6027
USPC ...................................................... 455/414.1
See application file for complete search history.

(56) References Cited

U.S. PATENT DOCUMENTS

| | | | |
|---|---|---|---|
| 7,307,997 B2 | 12/2007 | Vinokurov et al. | |
| 7,653,373 B2 | 1/2010 | Yamamori | |
| 8,090,648 B2 | 1/2012 | Zoldi et al. | |
| 8,097,800 B2 * | 1/2012 | Bastian | G10H 3/03 84/612 |
| 8,279,860 B1 | 10/2012 | Nucci et al. | |
| 8,503,313 B1 * | 8/2013 | Lang | H04L 12/1482 379/139 |
| 9,060,057 B1 * | 6/2015 | Danis | H04L 63/083 |
| 9,462,105 B2 * | 10/2016 | Feller | H04M 1/663 |
| 10,313,516 B2 | 6/2019 | Ansari | |
| 2005/0185777 A1 * | 8/2005 | Russell | H04M 15/43 379/111 |
| 2006/0166661 A1 | 7/2006 | Lin | |
| 2007/0121596 A1 * | 5/2007 | Kurapati | H04M 3/436 370/356 |
| 2009/0041205 A1 * | 2/2009 | Russell | H04M 3/436 379/35 |
| 2012/0314852 A1 * | 12/2012 | Suri | H04M 7/0015 379/114.01 |

(Continued)

FOREIGN PATENT DOCUMENTS

| | | |
|---|---|---|
| EP | 1330105 | 7/2003 |
| EP | 1976247 | 10/2008 |

(Continued)

*Primary Examiner* — Binh Kien Tieu
(74) *Attorney, Agent, or Firm* — BakerHostetler

(57) ABSTRACT

Methods and systems are described for processing calls. An example method may comprise receiving a message for establishing a call. Identification information in the message may be compared to screening data. If a match is found, the message may be forwarded to a screening server. The screening server may establish a call based on the session and provide information indicative of a level of trust associated with the call.

20 Claims, 16 Drawing Sheets

(56) References Cited

U.S. PATENT DOCUMENTS

| | | | |
|---|---|---|---|
| 2014/0128041 A1* | 5/2014 | Horn | H04W 4/60 |
| | | | 455/414.1 |
| 2014/0254785 A1* | 9/2014 | Ezell | H04M 3/42127 |
| | | | 379/211.02 |
| 2015/0156300 A1* | 6/2015 | Park | H04M 1/663 |
| | | | 455/414.1 |
| 2018/0183931 A1 | 6/2018 | Quattrocchi et al. | |
| 2019/0116268 A1 | 4/2019 | Li et al. | |
| 2021/0274040 A1* | 9/2021 | Bouvet | H04M 3/436 |

FOREIGN PATENT DOCUMENTS

| | | |
|---|---|---|
| EP | 3214861 | 9/2017 |
| FR | 2956548 | 8/2011 |
| WO | 01/45364 | 6/2001 |
| WO | 2009/098289 | 8/2009 |

* cited by examiner

SYSTEMS AND METHODS FOR PROCESSING CALLS

BACKGROUND

Unwanted solicitation and/or scam phone calls are a problem. One scam, often called the one-ring scam, involves calling a user only to quickly hang up. This behavior may lure the called user to call back the original scam caller who may be at an international location, thereby unexpectedly generating a telephone charge. Current solutions are limited in the ability to allow nuanced options for handling these calls. Thus, improvements are needed.

SUMMARY

Methods and systems are disclosed for screening calls that may be untrustworthy. A network device may receive incoming calls for users. The incoming calls may be analyzed to determine patterns associated with a particular caller. An example pattern may be a large number of calls from a user that have call durations below a threshold. These calls may be tracked to generate a screening list (e.g., or screening data, such as a database) of potential scam callers. This list may be combined with other lists of scam callers.

The network device may compare calls, whether incoming or outgoing, to the information on the screening list. If a call matches the screening list (e.g., originating caller or destination is indicated on the list), the call may be transferred to a screening server. Additional criteria may also be applied in the determination to transfer to the screening server, such as a duration of time between receipt of a call from a caller on the screening list to the time a user returns the call. The screening server may establish a communication session with the user and provide information, such as a trust level or warning, about the destination or origin. The screening server may allow the user to input (e.g., via pressing a button, speaking a command) whether to proceed with or end a call.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

There is a lack of capabilities for communication service providers to warn its customers in the context of making outbound calls to a potential scammer. This issue is manifested in the case of so-called "one-ring" scams, in which scammers call and disconnect before a call is picked up. An unsuspicious user when seeing a missed inbound call may dial back and incur excessive network and service charges. The scammer who receives the user's call may also attempt to extract personal information of the user. The disclosed techniques provide a mechanism to intervene in calls to suspicious destinations and play an announcement to the users about the potential risk, and allow the users to drop the calls. In addition to being used as a warning system for scamming calls, the disclosed techniques also can be used to play during call processing announcements for a variety of purposes, such as health emergencies, local weather warnings, Amber alerts, and/or the like.

The disclosed techniques may be used to manage one-ring scams and other scenarios in which announcements may be provided to users. An outbound call from a trusted network may be received and analyzed by a network device, such as routing device, a border gateway control function device, and/or the like. The outbound call may be in response to an earlier call from a potential one ring scammer or other user. The network device may apply screening criteria to determine whether the user being called is on a screening list (e.g., scam telephone number list).

A potential scam telephone number list may be accessed by the network device through an external source. If the network device determines a called user matches an entry in the screening list, the network device may send the call to a screening server (e.g., or pre-call announcement server (PCAS)). The screening server may establish a media communication session with the user and play an announcement to the warn the user, such as the following: "The number you try to reach could be a potential scammer, press any key to continue the call or hung up to disconnect." Any other appropriate announcement may be used. The user may decide how to respond to the announcement.

The screening server may also be used for other scenarios, such as playing any announcements to users in any scenarios. The announcement may include billing information, advertisements, government announcement, emergency alerts (e.g., weather alert, Amber alerts), a combination thereof, and/or the like. The screening server may first notify a user that a message is forthcoming by playing a message, such as the following: "Your call will be processed while we play a short announcement for you." At the end of the announcement, call processing may proceed as usual and result in regular completion or rejection of the call. If user input is required, in the form of interactive voice responses (IVR), the user may provide answers to the IVR prompts.

Figure 1:
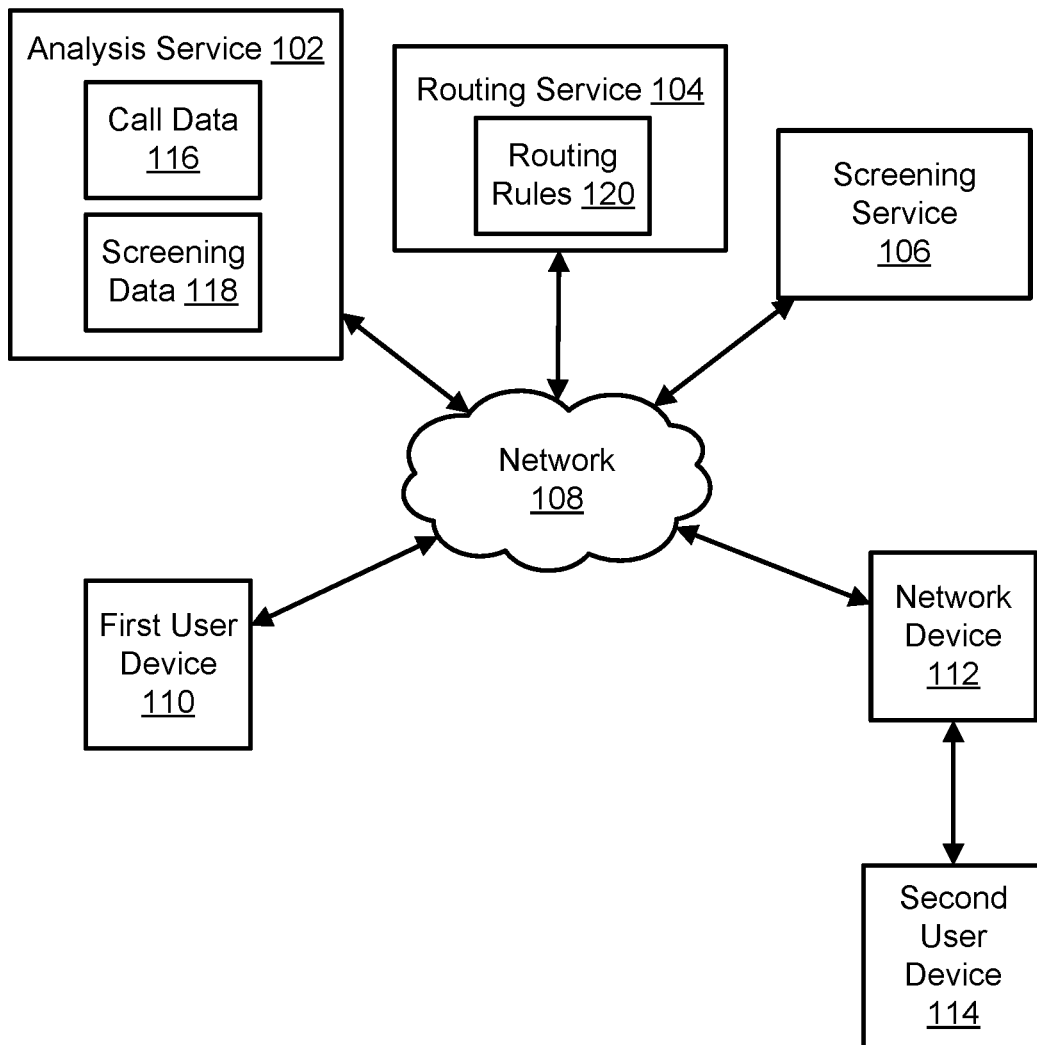
FIG. 1 is a block diagram illustrating an example environment.

FIG. 1 shows a block diagram of an example system 100 for communication. The system 100 may comprise an analysis service 102, a routing service 104, a screening service 106, a network 108, a first user device 110, a network device 112, a second user device 114, or a combination thereof. It should be noted while the singular term device is used herein, it is contemplated that some devices may be implemented as a single device or a plurality of devices (e.g., via load balancing). Additionally, any service may be implemented on one or more computing devices. The analysis service 102, the routing service 104, the screening service 106, the network 108, the first user device 110, the network device 112, the second user device 114 may each be implemented as one or more computing devices. Any device disclosed herein may be implemented using one or more computing nodes, such as virtual machines, executed on a single device and/or multiple devices.

The analysis service 102, the routing service 104, the screening service 106, the first user device 110, the network device 112, the second user device 114 may be communicatively coupled via one or more networks, such as network 108. The network 108 may comprise a public and/or private network. The network 108 may facilitate communication via one or more communication protocols. The network 108 may comprise fiber, cable, a combination thereof. The network 108 may comprise wired links, wireless links, a combination thereof, and/or the like. The network 108 may comprise routers, switches, nodes, gateways, servers, modems, and/or the like.

The first user device 110 may comprise a user device, such as a landline telephone, a smart phone, a desktop, a laptop, a portable computing device, a mobile computing device, a stationary computing device, a wearable computing device, etc. The first user device 110 may comprise and/or be associated with a first user identifier. The first user identifier may comprise a number, such as a phone number. The first user identifier may comprise an address, such as a media access control address (MAC address) and/or an Internet Protocol address (IP address). The first user device 110 may be associated with an entity, such as a subscriber to a service.

The first user device 110 may receive input from a user. The input may cause the first user device 110 to initiate a communication with the second user device 114. The first user device 110 may cause one or more messages to be transmitted (e.g., to the network device 112, to the second user device 114) associated with the communication. The one or more messages may comprise the first user identifier. In some scenarios, the first user device 110 may be engaged in a one-ring scam. The first user device 110 may send a message to initiate a call with the second user device 114 (e.g., and a plurality of additional user devices). The first user device 110 may, within a short time after (e.g., before the called user answers) the original message, send another message to cancel, terminate, and/or end the call with the second user device 114.

The goal of the first user device 110 may be to lure the user of the second user device 114 to call the first user device 110. Calling the first user device 110 may trigger financial charges to be applied to an account associated with the second user device 114. The first user identifier and/or telephone number of the first user device 110 may have a format that is similar to the format of the local numbers in the region where the second user device 114 is located. If the local numbers have three digit area codes, the first user identifier and/or associated telephone number may have a three digit code as well. If the user of the second user device 114 sees the telephone number on a missed call log, the user may think the number is a local one and call the number back, thereby inadvertently triggering an international charge and/or other charges associated with calling the first user device 110.

The network device 112 may be configured to process (e.g., route) calls for a plurality of devices, including calls to and from the second user device 114. The network device 112 may store a history of the calls. The history of calls may be accessed and/or stored as call data 116. The analysis service 102 may be configured to analyze the call data 116.

The analysis service 102 may be configured to generate and/or update screening data 118 based on analysis of the call data 116. The analysis may comprise any combination of techniques shown in FIG. 3A-B and the accompanying paragraphs and/or any technique for determining screening data elsewhere described herein. The screening data 118 may comprise a list and/or a database of data used for determining whether a call should be processed using the screening service 106.

The screening data 118 may comprise a plurality of entries indicative of untrusted users. An entry may comprise an indication of a user, such as a user identifier, telephone number, name, domain, combination thereof, and/or the like. The screening data 118 may comprise a number of suspicious calls associated with the user. A call may be identified as suspicious based on any criteria. Example criteria may comprise criteria associated with identifying one-ring scam calls. A criteria may be a call duration of the call being below a first threshold of time. The first threshold of time may be a threshold associated with detecting one-ring scam calls. The first threshold may have a value for detecting calls that are one ring or less in duration. As a few examples, the first threshold may comprise 15 seconds, 10 seconds, 5 seconds, 1 second, 500 milliseconds, 100 milliseconds, 50 milliseconds, and/or any other appropriate amount of time for detecting a one-ring call.

The criteria may also be used to remove entries from the screening data. A threshold number of calls may be used to remove and/or add an indication of a user to the screening data. Each time a call is detected from the user during a time period and the call matches at least one of the criteria (e.g., call duration below the first threshold), then the number of suspicious calls associated with the user may be increased. At the end of the time period, if the number of calls associated with the user is below the threshold number, then the user may be removed from the screening data 118. In another scenario, if the number of calls associated with the user is above the threshold number (e.g., or the threshold number is satisfied or not satisfied), then the user may be added to the screening data 118.

The analysis service 102 may be configured to analyze a set (e.g., or a subset) of calls of the call data 116. The analysis service 102 may select the set based on a time period, time range, index number, and/or any other criteria. The analysis service 102 may analyze the set of calls by determining one or more call durations associated with each entry. A first call duration may be determined for an entry. The first call duration may be determined based on a difference between a stop time and a start time of a call indicated in the entry. A second call duration may be determined. The second call duration may be based on session initiation protocol signals, such as a time difference between two SIP messages. The second call duration may be determined based on a time difference between a SIP message that ends a call (e.g., a SIP Cancel timestamp) and a SIP message that is associated with beginning a call (e.g., a SIP Ringing timestamp).

The first call duration and/or second call duration may be compared to one or more thresholds. If one or both of the call durations are below the one or more thresholds, an indication (e.g., phone number, identifier, domain, username, combination thereof) of user originating the call may be added to the screening list. In some scenarios, the first call duration may be compared to a first threshold. If the first call duration is less than the first threshold, then a second call duration may be determined. The second call duration may be compared to a second threshold (e.g., shorter than the first threshold). If the second call duration is less than the second threshold, then the user associated with the call may be added to the screening data 118.

The network device 112 may be configured to route the calls based on the routing service 104. The routing service 104 may comprise a plurality of routing rules 120. The network device 112 may use the routing service 104 for routing decisions and/or receive the routing rules 120 from the routing service and perform routing decisions. One or more of the plurality of routing rules 120 may associate a triggering condition with an action to analyze a call using the analysis service 102. A triggering condition may comprise the call being below a threshold of time associated with returning a call. A user may receive a one-ring call, and then return the call. If the time between the one-ring call and the return call is below the threshold of time, then the call may be analyzed by the analysis service 102. The time may be determined based on calculating a difference between a SIP message of the first call and SIP message of the second call. The analysis service 102 may compare an identifier of the user being called to the screening data 118. If a match occurs, the call may be sent to the screening service 106 (e.g., to warn the user).

The plurality of routing rules 120 may be associated with corresponding network entities. A network entity may have a set of routing rules that are specific and/or customized for the network entity. The network entity may input the set of routing rules. A network entity may comprise a network provider, service provider, organization, and/or the like. The routing rules may be used for routing calls for the network entity. Any calls received from the network entity (e.g., from a user of the network entity) and/or directed to the network entity (e.g., to a user of the network entity) may be processed using the routing rules associated with the network entity. The plurality of routing rules 120 may comprise one or more trust rules associating routing information with corresponding actions. A first action of the corresponding actions may comprise screening a call using one or more of the analysis service 102 or the screening service 106. A second action of the corresponding actions may comprise allowing the call to be processed without using one or more of the analysis service 102 or the screening service 106. Calls that match conditions associated with trusted entities and/or conditions may be associated with allowing the call to be processed without using the analysis service 102 or the screening service 106. Calls that match conditions associated with untrusted entities and/or conditions may be associated with processing the call using one or more of the analysis service 102 or the screening service 106.

The set of routing rules associated with a network entity may indicate a rule to use the screening data 118 (e.g., or a specific customized version of the screening data 119) and/or the screening service 106 (e.g., or a specific customized version of the screening data 119). The network entity may provide a list of users and/or other filtering criteria that may be added to the screening data. This custom screening data may only be applied to calls associated with the network entity. The network entity may set specific routing conditions that trigger analyzing calls using the screening data 118. The network entity may set specific routing conditions that trigger using the screening service 106 (e.g., with or without a call matching the screening data 118).

The network device 112 may be configured to process at least a portion of the calls by sending the calls to the screening service 106. A message indicative of a call may be analyzed using the routing rules 120. If the routing rules 120 indicate that the analysis service 102 and/or screening data 118 should be used to process the message, then the analysis service 102 may be queried based on the message. A trunk group (e.g., outgoing trunk group, incoming trunk group) may be determined based on the message. As an example, an address, domain, and/or other destination information may be determined from the message. This information may be used to determine the trunk group and/or network entity associated with routing the message (e.g., to the next hop). If routing rules are associated with the trunk group and/or network entity, then the routing rules may be processed to determine whether to use the analysis service 102 and/or screening data. Trunk groups and/or network entities with a higher trust level may be processed (e.g., as indicated by the associated routing rule) without using the screening data 118 and/or analysis service 102. Trunk groups and/or network entities with a lower trust level may be processed (e.g., as indicated by the associated routing rule) by the screening data 118 and/or analysis service 102. An example routing rule may specify that the outgoing trunk group and/or associated network entity and the corresponding routing action related to the analysis service 102.

The analysis service 102 may analyze a call by comparing a message (e.g., SIP message, SIP invite message) associated with the call to the screening data 118. One or more identifiers in the message may be determined, such as an identifier associated with the calling user and an identifier associated with the called user. If an identifier associated with the calling user and/or an identifier associated with the called user matches the screening data, then the call (e.g., the message) may be sent to the screening service 106. The analysis service 102 may user other rules and/or criteria to determine whether to send the call to the screening service 106. Example criteria may comprise length of time between a one-ring call and a user returning the one ring call. The length of time may be compared to a threshold, and if lower than the threshold, then the call may be sent to the screening service 106.

The screening service 106 may receive a call (e.g., message, SIP message, SIP invite message) from one or more of the network device 112, the routing service 104, or the analysis service 102. The screening service 106 may establish, based on receiving the call, a communication session with the second user device 114. The communication session may comprise and/or be configured to communicate any media, such as video, audio, text, a combination thereof, and/or the like. The communication session may be established based on session initiation protocol. The communication session may be configured for allowing a user of the second user device 114 to input a command, such as via pressing a button on a phone, providing a spoken command, hanging up the call, and/or the like. The command may comprise requesting that the call be completed, requesting that the call be ended, adding the other user associated with the call to a personal block list, and/or the like.

The screening service 106 may be configured to use an interactive voice response service for the communication session. The screening service 106 may provide one or more announcements relevant to the call. The announcement may indicate that the other user associated with the call is untrusted, associated with a low trust level, is determined to be a spam caller, and/or the like. The screening service 106 may provide multiple options for responding to the announcement, such as requesting that the call be completed, requesting that the call be ended, adding the other user associated with the call to a personal block list, accessing additional menu options, and/or the like. Depending on how the user responds, the screening service 106 may connect the call between the two user, end the call, and/or the like. Example session initiation protocol signaling for processing the calls is shown in more detail in FIGS. 4A-F and described further herein.

The second user device 114 may comprise a user device, such as a landline telephone, a smart phone, a desktop, a laptop, a portable computing device, a mobile computing device, a stationary computing device, a wearable computing device, etc. The second user device 114 may comprise and/or be associated with a second user identifier. The second user identifier may comprise a number, such as a phone number. The second user identifier may comprise an address, such as a media access control address (MAC address) and/or an Internet Protocol address (IP address). The second user device 114 may display/output messages (such as announcements, warnings, caller ids, sender phone numbers, etc.) based on calls and/or one or more signals received from the network device 112, the screening service 106, and/or the like. A user may reject a communication between the first user device 110 and the second user device 114 by engaging input into the second user device 114. A user may cause a communication between the second user device 114 and the first user device 110 to begin by engaging input into the second user device 114.

Figure 2A:
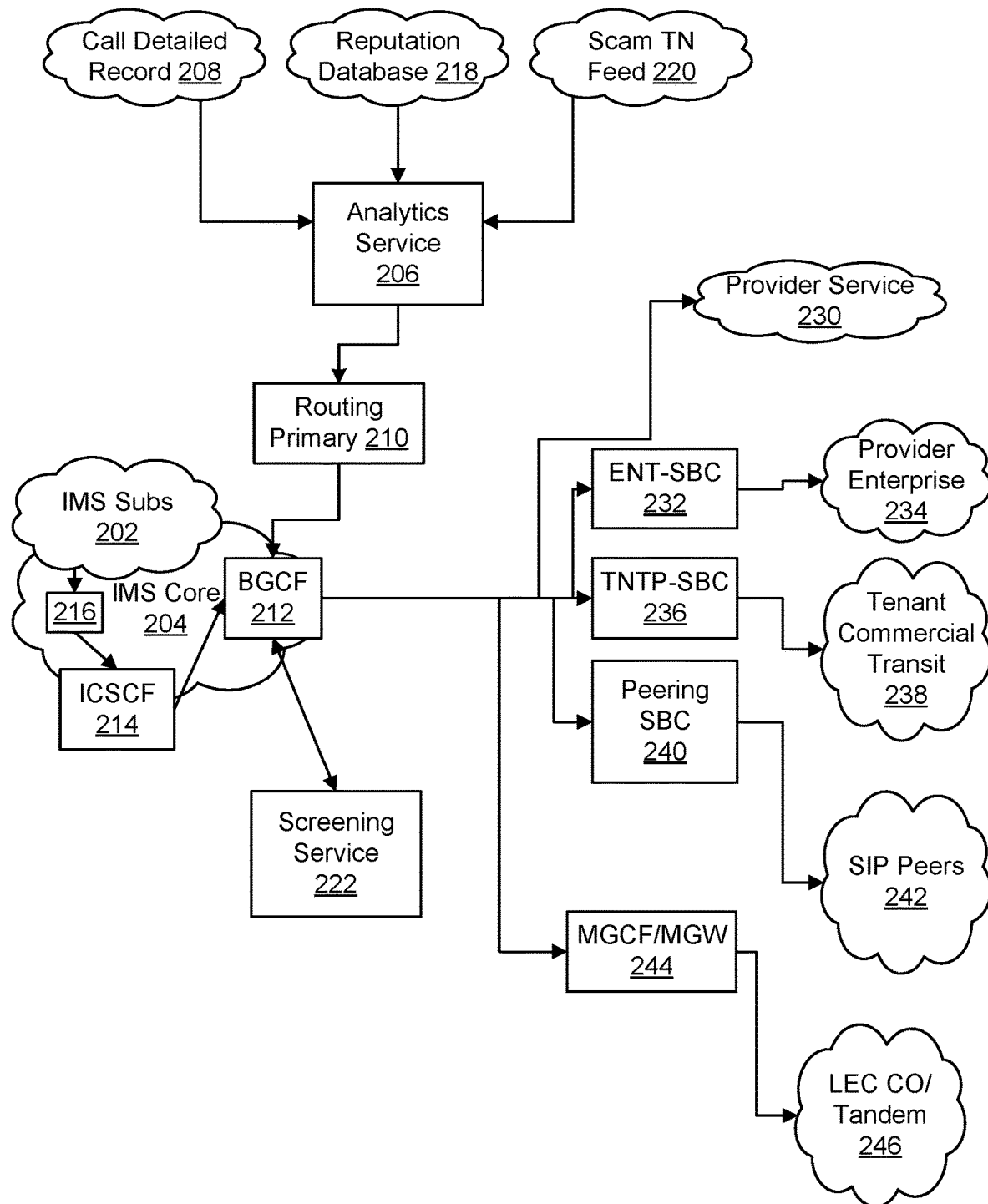
FIG. 2A is a block diagram illustrating an example environment.
Figure 2B:
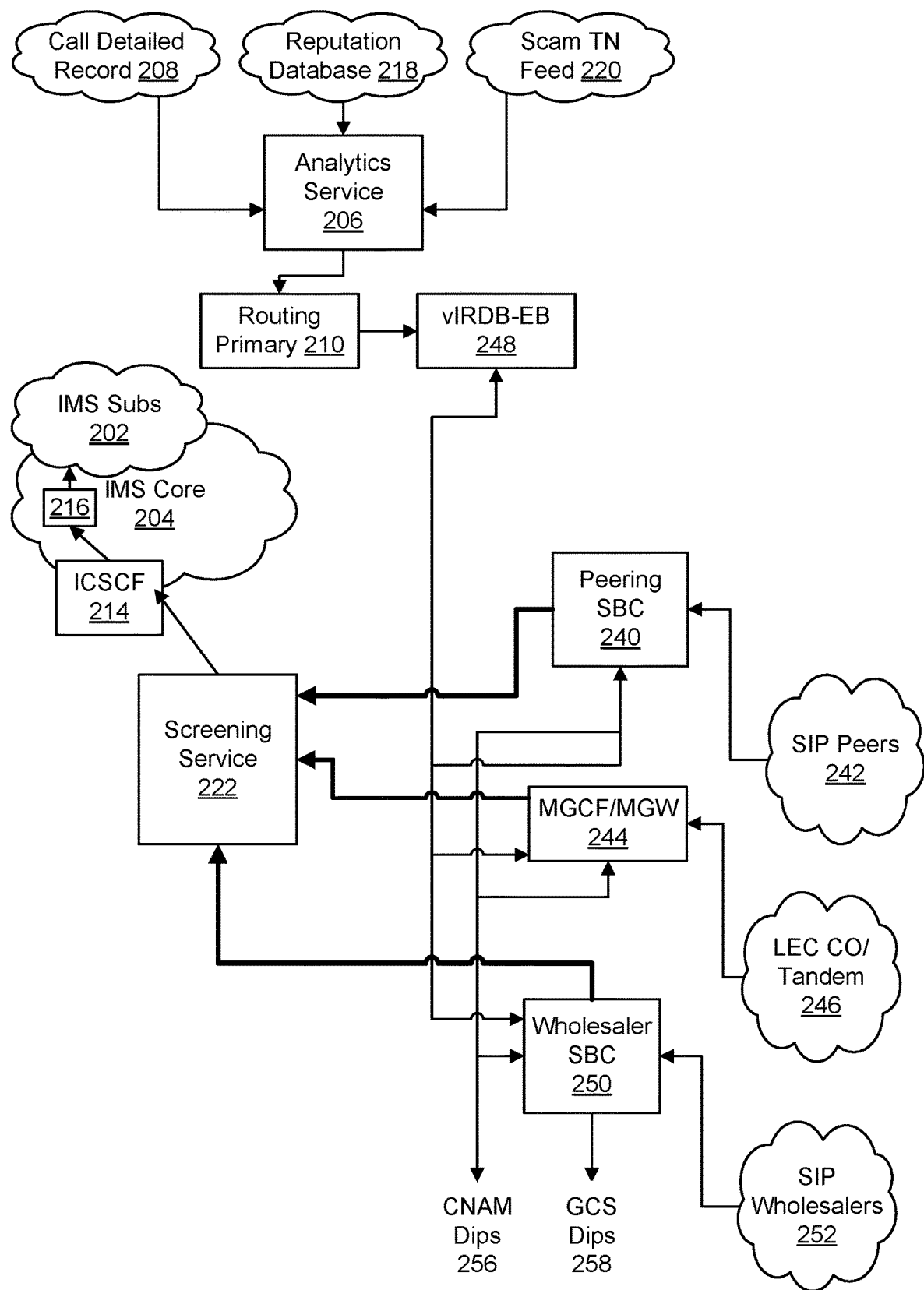
FIG. 2B is a block diagram illustrating an example environment.

FIG. 2A and FIG. 2B are block diagrams illustrating an example environment. FIG. 2A also shows a call flow for an outgoing call, and FIG. 2B shows a call flow for in incoming call. It should be understood that the methods and systems described herein are not limited to the example environment, which is only used for purposes of illustration. The example environment may comprise one or more Internet Protocol (IP) Multimedia Subsystem (IMS) subscribers 202, an IMS core 204, an analytics service 206, a call detail record 208, a routing database (DB) primary 210, a reputation database 218, a scam telephone number feed 220, a screening service 222, a peering session border controller (SBC) 240, a Session Initiation Protocol (SIP) Peers network 242, a media gateway controller function and/or a media gateway 244, and a local exchange carrier (LEC) and/or tandem network 246.

The IMS core 204 may comprise one or more devices configured to route messages. A device for routing messages may comprise a switch, a router, a Breakout Gateway Control Function (BGCF) 212, an Interrogating Call Session Control Function (I-CSCF) 214, a Home Subscriber Server (HSS) 216, a Serving Call Session Control Function (S-CSCF), a telephony application server (TAS), and/or a broadband application server (BAS).

The analytics service 206 may provide routing instructions and/or screening data to the routing DB primary 210. The analytics service 206 may generate the screening data (e.g., screening lists) based on one or more of the call detailed record 208, the reputation database 218 (e.g., an external source that indicates scam callers), or the scam telephone number feed 220. The analytics service 206 may analyze the call detailed record 208 to determine a list of possible one-ring scam callers. The list of possible one-ring scam callers may be combined with data from the reputation database 218 and/or the scam telephone number feed 220 to form screening data. The screening data may be stored by the analytics service 206 and/or sent to the routing DB primary 210.

The routing DB primary 210 may comprise a database for routing instructions and/or screening data. The routing DB primary 210 may populate the database with the routing instructions and/or screening data received from the analytics service 206. The BGCF 212 may refer to the routing DB primary 210 for the routing instructions and/or screening data.

One of the IMS subscribers 202 may send a message via the IMS core 204 to establish an outbound call. The message may be forward to the BGCF 212 via one or more of the HSS 216 or the ICSCF 214. The BGCF 212 may be configured to route the message based on the routing instructions and/or screening data. If the message matches the screening data (e.g., and routing based on the screening data is enabled), the message (e.g., or another similar message, such as another invite message) may be sent to the screening service 222.

The BGCF 212 may determine which network entity (e.g., or tenant) the call is associated with by looking at a trunkgroup, SIP Organization header, the domain part of the calling number URI, or a combination thereof. BGCF 212 can screen the calling and called numbers to decide to send calls to screening service 22. For instance, a tenant called "Spammy IMS" may have users with calling number URI in the form of "17325555555@ims.spammy.com". The domain part "spammy.com" may be used to determine the network entity. Furthermore, it may determine that the called numbers of NPA-Nxx-xxxx is one of the scamming numbers by matching it against the provisioned pool of scamming numbers. If there is a match, the call may be sent to the screening service 222.

The screening service 222 may establish a call between the IMS subscriber and the screening service 222. The screening service 222 may provide an announcement message (e.g., via audio, video, text, or a combination thereof) in the call to the IMS subscriber. The announcement message may provide a warning, an indication of the destination being identified as untrustworthy, an indication of the destination being identified as on a scammer list, and/or any other relevant information. The screening service 222 may provide options for proceeding to complete the call, terminate the call, and/or the like. The screening service 222 may receive via the call user input, such as pressing a button, speaking a command, and/or the to indicate how to proceed. If the IMS subscriber indicates to terminate the call, then the call may be ended.

If the IMS subscriber indicates a preference to complete the call, then the message may be forwarded to the destination by the BGCF. If a destination associated with the message is located within the SIP Peers network 242, then the BGCF 212 may forward the message to the peering SBC 240. The peering SBC 240 may forward the message to the destination within the SIP Peers network 242. If a destination associated with the message is located within the LEC and/or tandem network 246, then the BGCF 212 may forward the message to the media gateway controller function and/or the media gateway 244. The media gateway controller function and/or the media gateway 244 may forward the message to the destination within the LEC and/or tandem network 246.

FIG. 2B is a block diagram illustrating an example environment. The example environment may comprise many of the same elements as the example environment of FIG. 2A. The example environment may comprise an integrated routing database (IRDB and/or vIRDB-EB) 248, a wholesaler SBC 250, a SIP wholesalers network 252, or a combination thereof.

A message for establishing an incoming call may be received. Depending on the originator of the call, the message may be received via the peering SBC 240, the media gateway 244, or the wholesaler SBC 250. If an originator associated with the message is located within the SIP Peers network 242, then the originator may forward the message to the peering SBC 240. In response to receiving the message, the peering SBC 240 may initiate an integrated routing database (IRDB) 248 dip and/or a Caller-ID Name (CNAM) dip 256. The CNAM dip 256 may comprise looking up a name associated with a caller id associated with the message.

If an originator associated with the message is located within the LEC and/or tandem network 246, then the originator may forward the message to the media gateway controller function and/or the media gateway 244. In response to receiving the message, the media gateway controller function and/or the media gateway 244 may initiate an IRDB 248 dip and/or a CNAM dip 256. The CNAM dip 256 may comprise looking up a name associated with a caller id associated with the message.

If an originator associated with the message is located in the SIP wholesaler network 252, then the originator may forward the message to the wholesaler SBC 250. In response to receiving the message, the wholesaler SBC 250 may initiate an IRDB 248 dip and/or a CNAM dip 256. The CNAM dip 256 may comprise looking up a name associated with a caller id associated with the message.

The peering SBC 240, the media gateway 244, and/or the wholesaler SBC 250 may communicate with the IRDB 248 to determine whether the message should be routed to the screening service 222. The IRDB 248 may receive (e.g., or access) the screening data and/or routing information from the routing DB primary 210. The screening data and/or routing information may be used to determine whether to route the incoming call to the screening service 222. An identifier (e.g., telephone number) associated with the originator may be compared to identifiers in the screening data. If a match is found, the message may be sent to the screening service 222.

The screening service 222 may establish a call with an IMS subscriber 202 via the IMS core 204. The screening service 222 may provide an announcement message (e.g., via audio, video, text, or a combination thereof) in the call to the IMS subscriber. The announcement message may provide a warning, an indication of an incoming call being identified as untrustworthy, an indication of a call of the incoming call being identified on a scammer list, and/or any other relevant information. The screening service 222 may provide options for proceeding to complete the call, terminate the call, and/or the like. The screening service 222 may receive via the call user input, such as pressing a button, speaking a command, and/or the to indicate how to proceed. If IMS subscriber indicates to terminate the call, then the call may be ended.

If the IMS subscriber indicates a preference to complete (e.g., establish) the call, then the message from the incoming call may be forwarded to IMS subscriber. The IMS subscriber may accept the message and respond to establish the call. The screening server may respond to the original massage to establish the call. It should be understood, that in other implementations, one or more of the devices shown in FIG. 2A and FIG. 2B may be removed and/or other devices not shown may be included.

Figure 3A:
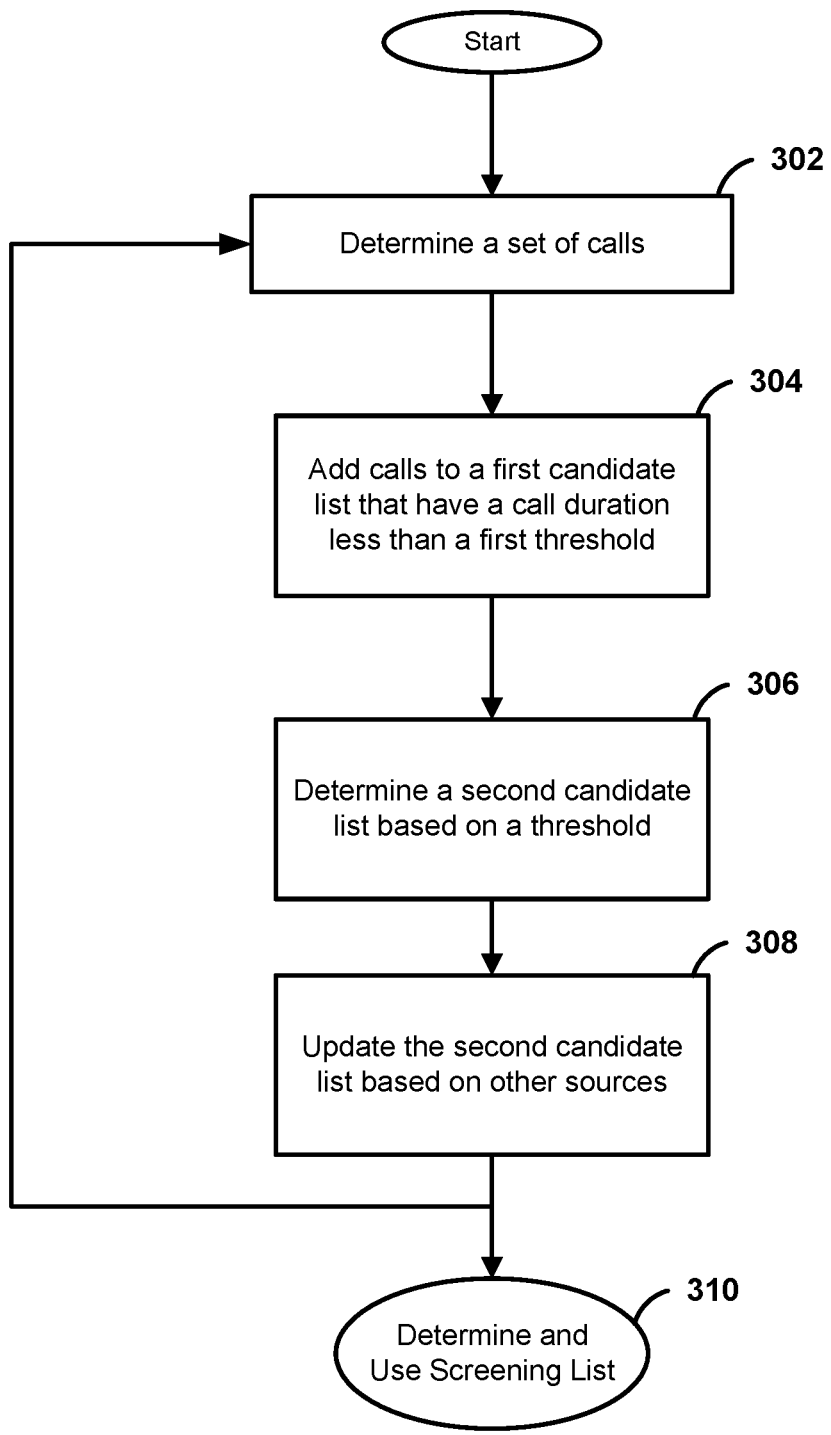
FIG. 3A is a flow diagram illustrating an example method.

FIG. 3A is a flow diagram illustrating an example method. At step 302, a set of calls (e.g., a set in a time range) may be determined. Call detail record files may be accessed. A set (e.g., or subset) of calls from the call detail record files may be accessed. Records from the call detail record files may be accessed for a time frame. The last X minutes and/or a time range of X minutes may be accessed. An example default value for X is 15 seconds, but any other time many be used.

At step 304, calls from the set of calls may be analyzed to identify calls that have a duration less than a threshold. The start time of a call may be subtracted from the start time of the call. The duration may be calculating in other ways, such as analyzing metadata, call detail records, comparing session initiation protocol messages, and/or the like. If the result is less than the threshold, the call and/or an identifier of the caller of the call may be added to a first candidate list (e.g., or database, data group). If the caller is already identified on the first candidate list, then a number of calls associated with the caller may be incremented.

At step 306, a second candidate list may be determined based on a threshold. Callers identified on the first candidate list may be analyzed to identify callers that have a number of calls below and/or above a threshold number of calls. An example threshold number may comprise five, but any number may be used. Optionally, the callers that have a number of calls below the threshold may be removed from the first candidate list. The callers remaining on the first candidate list after removing callers may be stored as a second candidate list (e.g., or an updated version of the first candidate list). In some scenarios, the second candidate list may be determined by adding callers to the second candidate list from the first candidate list that have a number of calls that are above the threshold number of calls. The callers on the second candidate list may be assigned time to live values (e.g., indicating a length of time to keep each record on the list).

At step 308, optionally, the second candidate list may be updated by one or more of combining the second candidate list with other lists or removing entries with expired time to live values. Other lists may comprise a scammer list from a different analytics process, a traceback group list, and/or the like.

At step 310, the updated list may be used as a screening list. Calls received by a routing device, such as a BGCF, may be analyzed to determine whether the to or from field of a matches an indication of user on the screening list. If a match is found, then the call may be sent to a screening server. The screening server may process the call as described further herein.

Figure 3B:
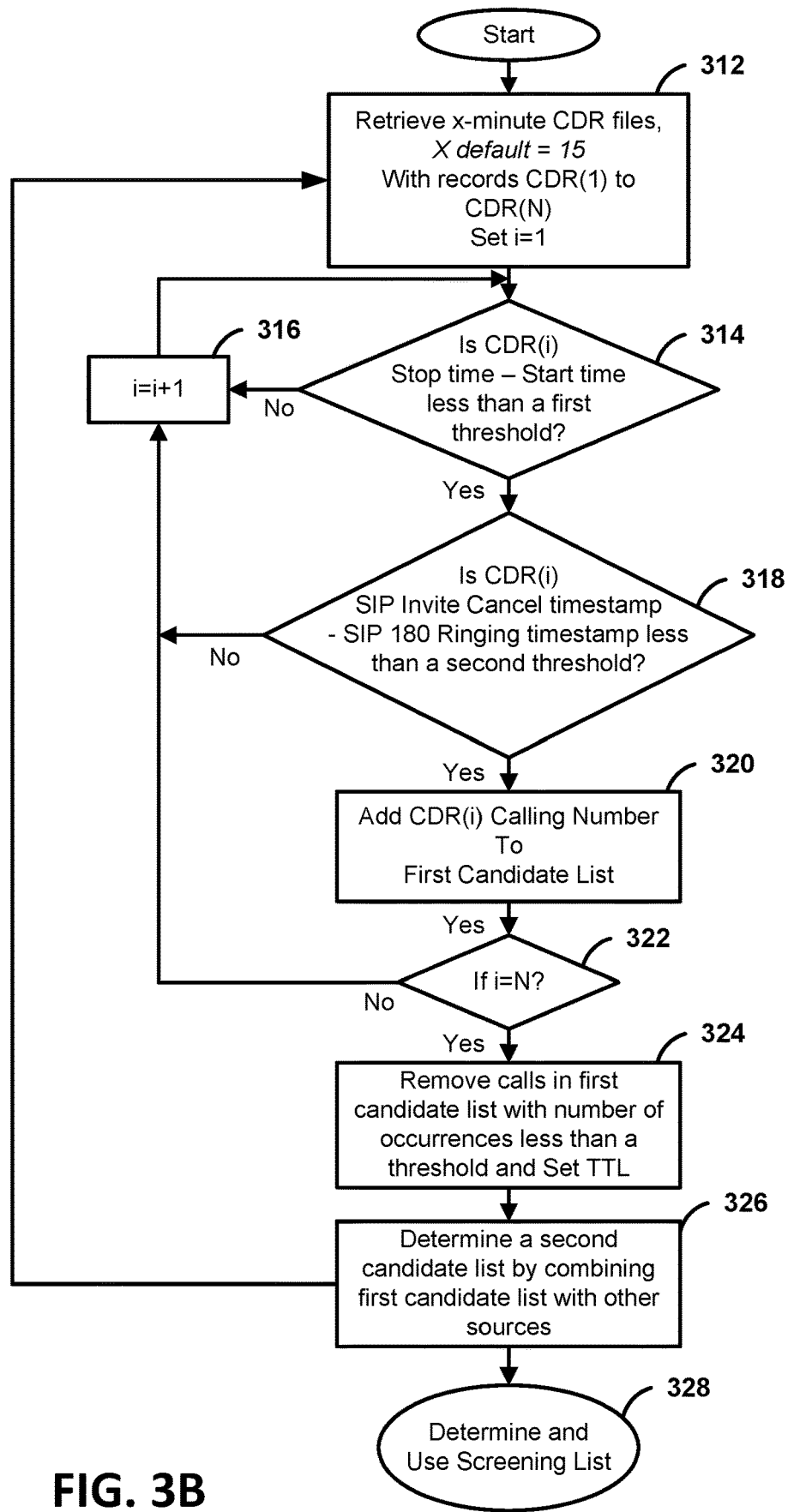
FIG. 3B is a flow diagram illustrating an example method.

FIG. 3B is a flow diagram illustrating an example method. At step 312, call detail record files may be accessed. A set (e.g., or subset) of calls from the call detail record files may be accessed. Records from the call detail record files may be accessed for a time frame. The last X minutes and/or a time range of X minutes may be accessed. An example default value for X is 15 seconds, but any other time many be used. For N records in the call detail record files, each record, denoted as i, may be analyzed.

At step 314, a call (e.g., the i-th call) from the set of calls may be analyzed to determine if the call has a first duration less than a first time threshold. An example first time threshold may be 5 seconds. The first duration may be calculated by subtracting the start time of a call from the stop time of the call. The start time and the stop time may be timestamps accessed from the call detail records. Each call may have a separate call detail record recorded for the call. If the result is more than the first time threshold, the method may proceed to step 316. If the result is less than the first time threshold, then the method may proceed to step 318.

At step 316, the value of i may be incremented by one. This allows for the process to analyze the next entry in the call detail record files. The i-th record may be accessed. The method may proceed to step 314.

At step 318, a call (e.g., the i-th call) from the set of calls may be analyzed to determine if the call has a second duration less than a second time threshold. The second duration may be based on session initiation protocol (SIP) signaling. A SIP trace log may be accessed to analyze the call. The SIP trace log may be different than the call detail record. The SIP trace log may comprise signaling (e.g., and timestamps of the signals) for the call, such as Invite, Ringing, Bye, Cancel, other error signals, and/or the like. The call may be analyzed by subtracting a first timestamp signal in the SIP trace log from a second timestamp of a second signal in the SIP trace log. The second duration may be calculated by subtracting a SIP 180 Ringing timestamp from a SIP Invite Cancel timestamp. An example second time threshold may comprise 100 milliseconds. The second time threshold may be less than the first time threshold. This step may result in decreasing the size of the potential callers for the screening list. If the result is more than the second time threshold, the method may proceed to step 316. If the result is less than the second time threshold, then the method may proceed to step 320.

At step 320, the calling number (e.g., number or other identifier of initiator of the call) of a call may be added to a first candidate list (e.g., or database, data group). The calling number may be assigned an initial number, such as 1 indicating the number of calls associated with the calling number. If the calling number is already on the first candidate list at the time step 320 is performed, then the number of calls associated with the calling number may be incremented (e.g., by 1, instead of adding another entry of the calling number). After adding the calling number to the first candidate list, the method may proceed to step 322. At step 322, the value of i may be compared to N, which is a number of calls in the set of calls (e.g., or an indication of the last call in the range of calls). If i is less than N, the method may proceed back to step 316, and further analysis may be provided for each remaining call until the last call in the set of calls is processed. If i is equal to N, the method may proceed to step 324.

At step 324, the first candidate list may be analyzed to determine whether to remove any of the calling numbers. Calling numbers that have a number of associated calls below a third threshold (e.g., within a set time period, within the time range) may be removed. An example third threshold may be 5. A time to live value may be set for each of the calling numbers on the first candidate list.

At step 326, a second candidate list may be determined. The second candidate list may be determined by combining the first candidate list with one or more other sources of untrusted calling numbers. Other sources may comprise a scammer list from other analytics, a traceback group list, a combination thereof, and/or the like. The second candidate list may be analyzed to remove any entries that have expired time to live values. The process may be repeated by returning to step 312.

At step 328, the remaining entries from the second candidate list may be published, stored, and/or sent as screening data (e.g., or screening list). The screening data may be used to determine which calls should be sent to a screening server as described further herein.

FIGS. 4A-4F are process diagrams that show the role of a screening server in a variety of processes. The process may include one or more of the devices of FIG. 2A-B, such as the IMS subs 202, ICSCF 214, serving call session control function (SCSCF) 260, SBC 262 (e.g., any of the SBC's disclosed), screening service 222, vIRDB-EB 248, Peering SBC 240, SIP Peers 242, routing primary 210, analytics service 206, call detailed record 208, reputation database 218, scam telephone number feed 220, and/or the like.

Figure 4A:
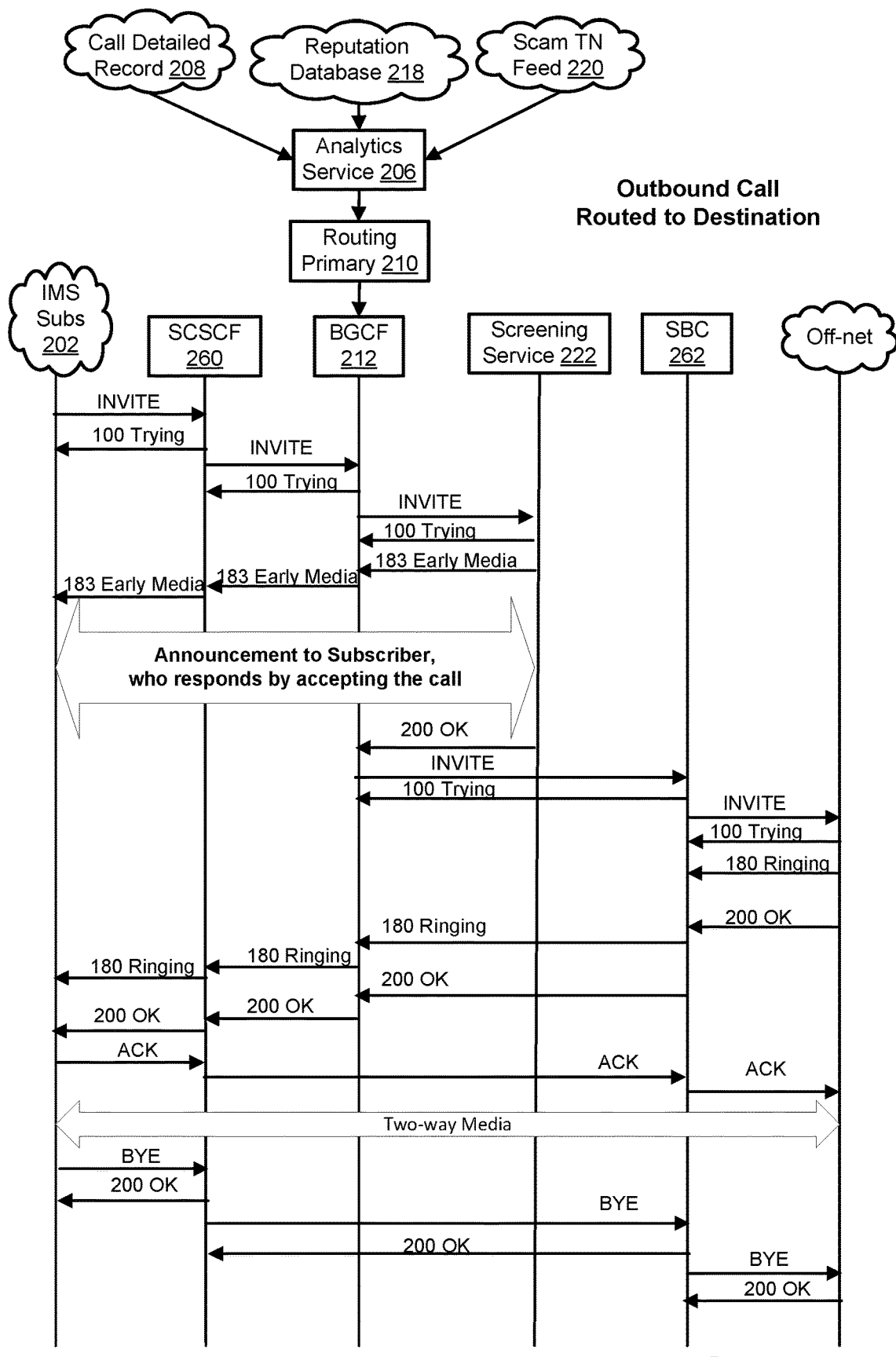
FIG. 4A is a process diagram illustrating an example call flow.

FIG. 4A shows a process diagram in which a screening server is used to process an outbound call. A IMS subscriber 202 sends an invite message for outgoing call that may be in response to a one-ring scam. The BGCF 212 receives the invite and determines to send the invite message to the screening service 222. The screening service 222 may provide an announcement, such as the following: "The destination you are trying you reach seems high risk. Press 1 to continue and 2 to disconnect or hung-up." The subscriber responds by pressing 1. An OK message is sent to the BGCF 212 from the screening service 222 based on the subscriber's response. The BGCF 212 then forwards the invite message to an SBC 262 which facilitates establishing a call with the destination.

Figure 4B:
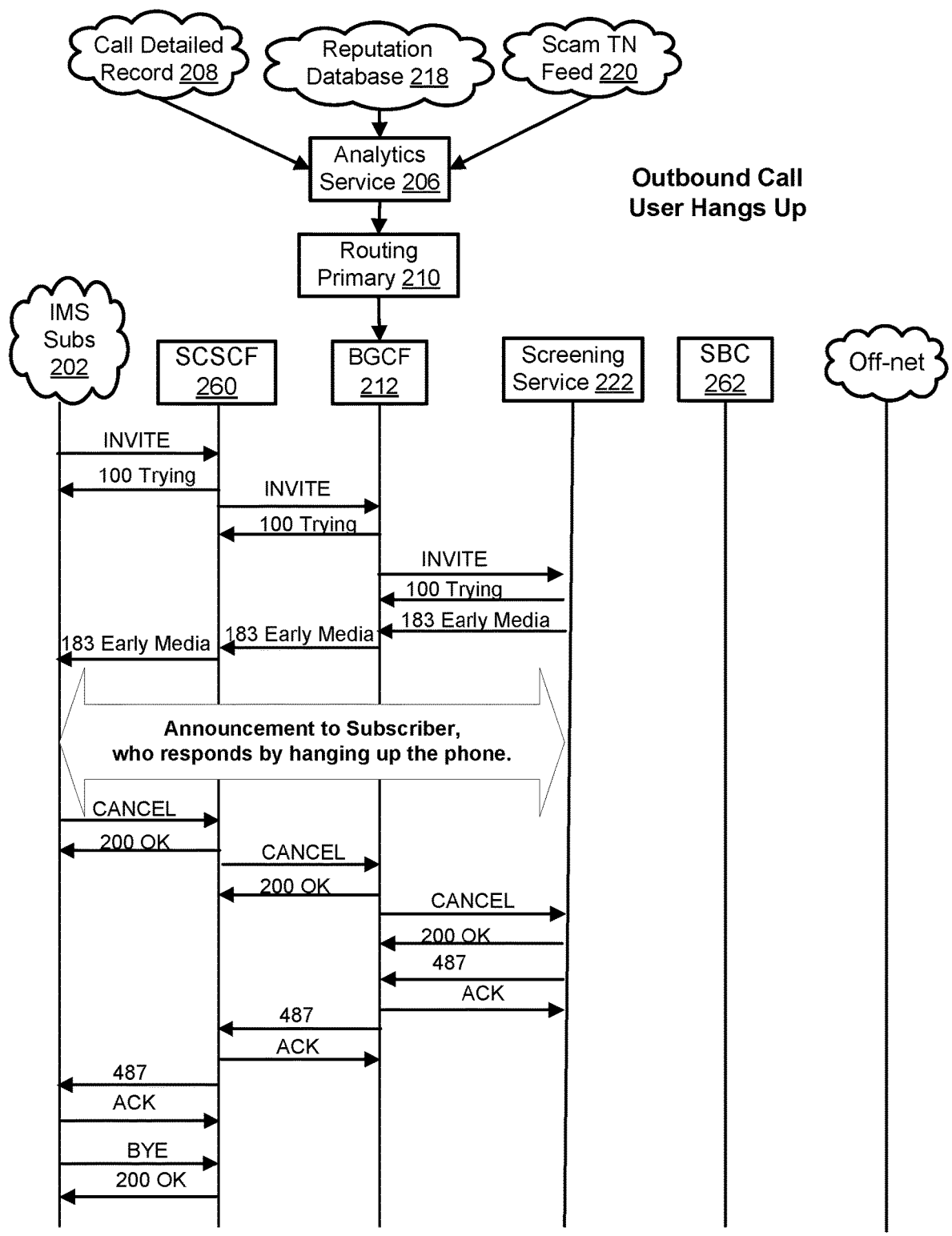
FIG. 4B is a process diagram illustrating an example call flow.

FIG. 4B shows a process diagram in which a screening server is used to process an outbound call. The calling user initiating the call decides to hang up the call with the screening server. A IMS subscriber 202 sends an invite message for outgoing call that may be in response to a one-ring scam. The BGCF 212 receives the invite and determines to send the invite message to the screening service 222. The screening service 222 may provide an announcement, such as the following: "The destination you are trying you reach seems high risk. Press 1 to continue and 2 to disconnect or hung-up." The subscriber responds by hanging up the phone. A cancel message is sent to the screening service 222 based on the subscriber's response. The screening service 222 sends a 487 response indicating that the prior request from the user was terminated. The call is then ended.

Figure 4C:
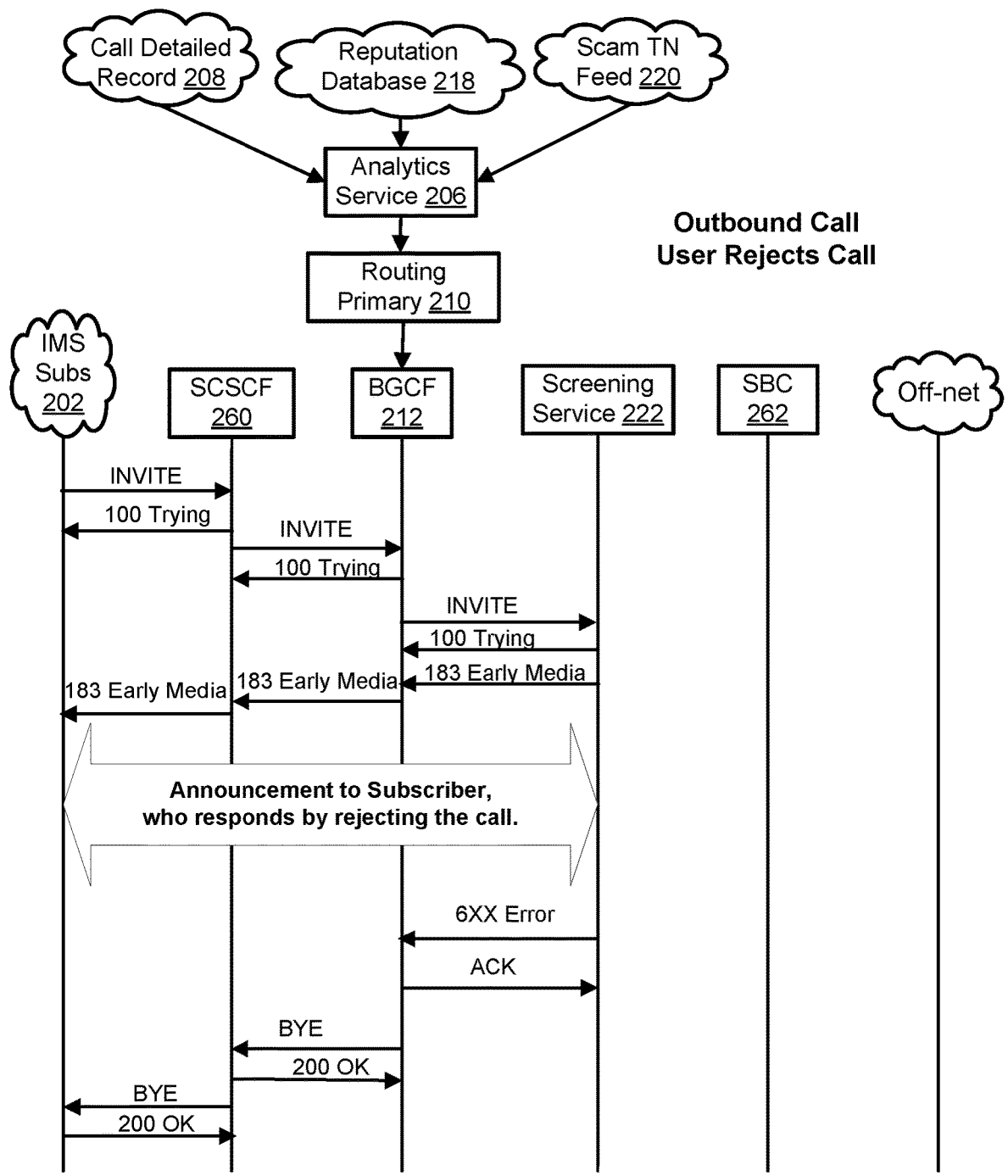
FIG. 4C is a process diagram illustrating an example call flow.

FIG. 4C shows a process diagram in which a screening server is used to process an outbound call. The calling user initiating the call indicates to the screening server that it would not like to proceed with the call. An IMS subscriber 202 sends an invite message for an outgoing call that may be in response to a one-ring scam. The BGCF 212 receives the invite and determines to send the invite message to the screening service 222. The screening service 222 may provide an announcement, such as the following: "The destination you are trying you reach seems high risk. Press 1 to continue and 2 to disconnect or hung-up." The subscriber responds by pressing 2 to disconnect. An error message (e.g., 6XX Error) may be sent to the BGCF 212 from the screening service 222. The call is then ended by the BGCF 212 by sending a bye message to the IMS subscriber 202.

Figure 4D:
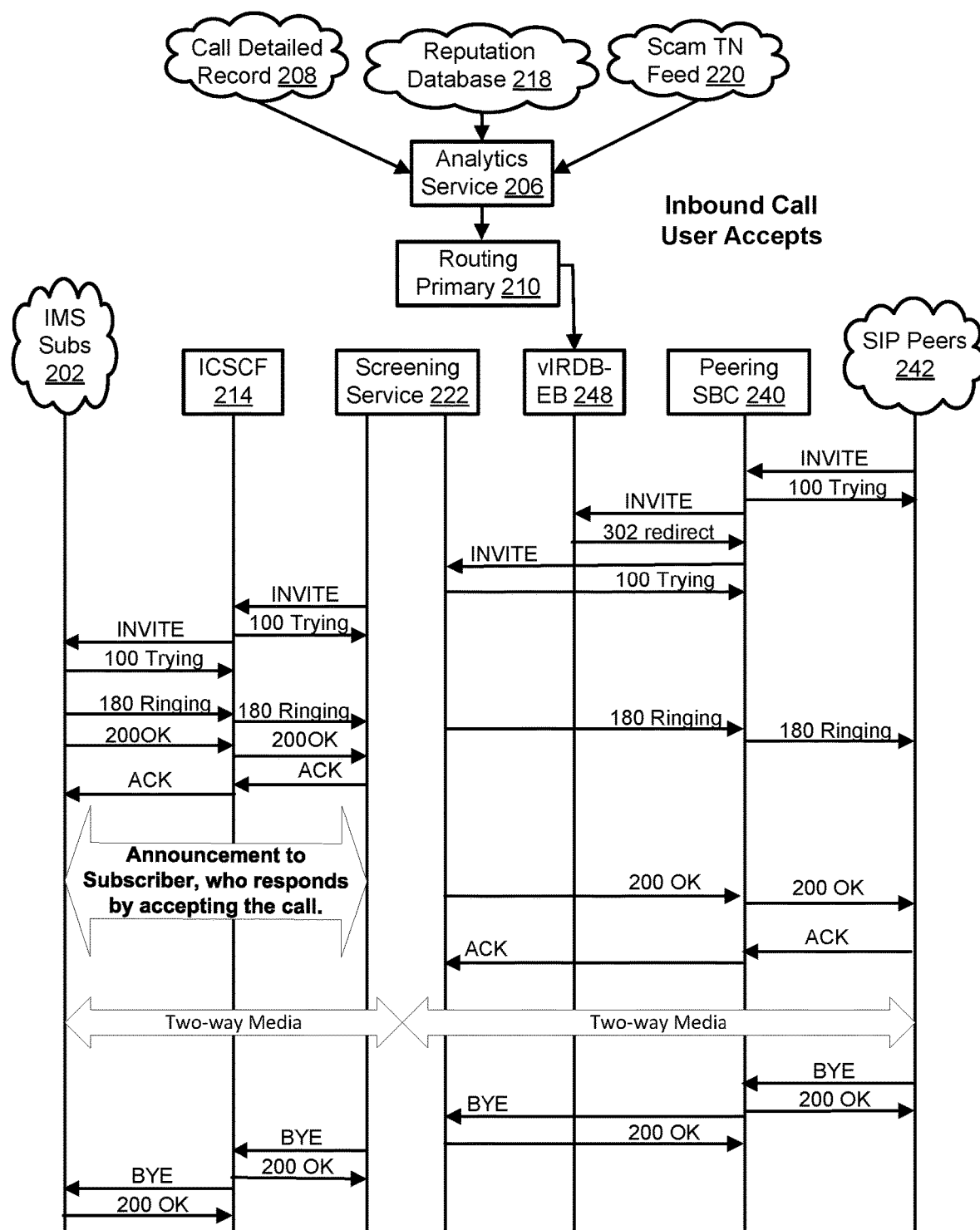
FIG. 4D is a process diagram illustrating an example call flow.

FIG. 4D shows a process diagram in which a screening server is used to process an inbound call. The user receiving the call indicates approval to the screening server to connect the inbound call. A call is then connected between the calling user and the called user. A SIP peer 242 sends an invite message to the peering SBC 240, which forwards the message to the vIRDB-EB 248. The vIRDB-EB 248 analyzes screening data and/or routing information from the routing primary 210. If a match is found between identification information in the message and the screening data and/or routing information, the vIRDB-EB 248 may forward the invite message to the screening service 222. The screening service 222 may provide an announcement, such as the following: "The caller trying to reach you seems high risk. Press 1 to continue and 2 to disconnect or hung-up." The subscriber responds by pressing 1 to connect. The screening service 222 sends a 200 ok message to facilitate connecting the IMS subscriber 202 with the originator of the call. The screening service 222 may function as a bridge between the IMS subscriber 202 and the originator or the IMS subscriber 202 and the originator may have a connection without the use of the screening service 222.

Figure 4E:
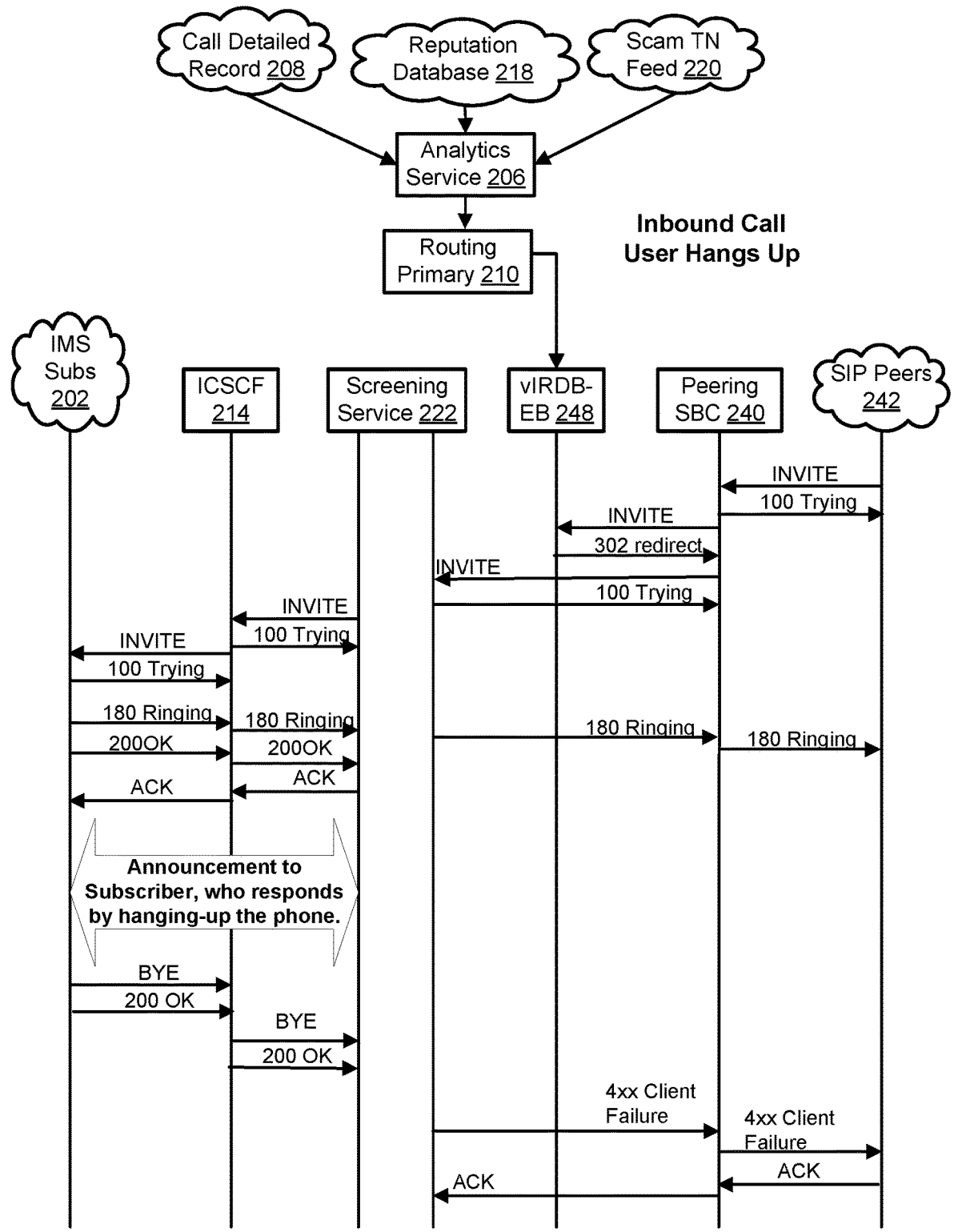
FIG. 4E is a process diagram illustrating an example call flow.

FIG. 4E shows a process diagram in which a screening server is used to process an inbound call. The user receiving the call decides to hang up the call from the screening server. A SIP peer 242 sends an invite message to the peering SBC 240, which forwards the message to the vIRDB-EB 248. The vIRDB-EB 248 analyzes screening data and/or routing information from the routing DB primary 210. If a match is found between identification information in the message and the screening data and/or routing information, the vIRDB-EB 248 may forward the invite message to the screening service 222. The screening service 222 may provide an announcement, such as the following: "The caller trying to reach you seems high risk. Press 1 to continue and 2 to disconnect or hung-up." The subscriber responds by hanging up. The IMS subscriber 202 sends a bye message to the screening service 222. The screening service 222 sends a 4XX response back to the peering SBC 240 indicating a client failure. The 4xx response is communicated to the SIP peer 242. The call is then ended.

Figure 4F:
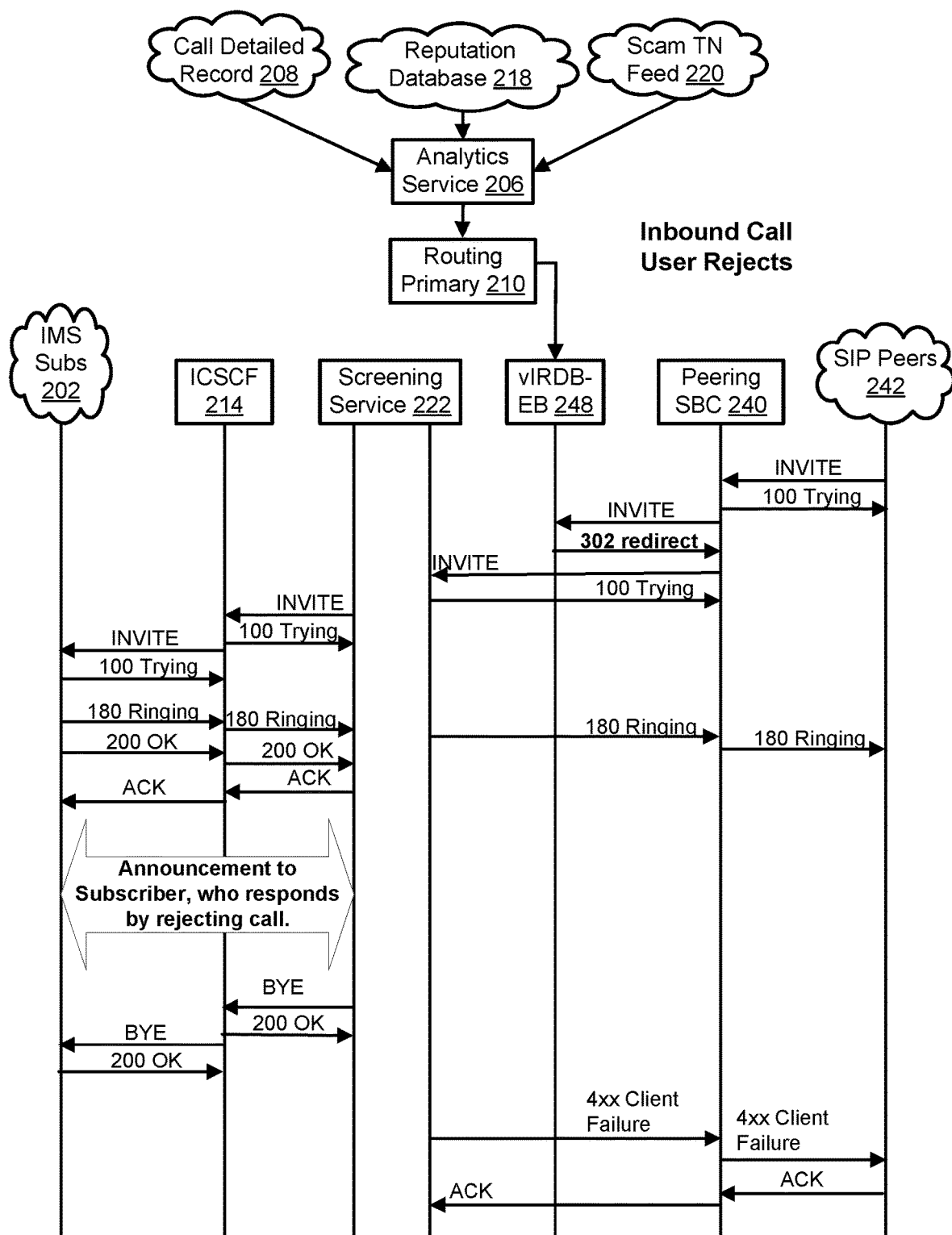
FIG. 4F is a process diagram illustrating an example call flow.

FIG. 4F shows a process diagram in which a screening server is used to process an inbound call. The user receiving the call indicates rejection of the call from the screening server. A SIP peer 242 sends an invite message to the peering SBC 240, which forwards the message to the vIRDB-EB 248. The vIRDB-EB 248 analyzes screening data and/or routing information from the routing DB primary 210. If a match is found between identification information in the message and the screening data and/or routing information, the vIRDB-EB 248 may forward the invite message to the screening service 222. The screening service 222 may provide an announcement, such as the following: "The caller trying to reach you seems high risk. Press 1 to continue and 2 to disconnect or hung-up." The subscriber responds by pressing a button indicating to disconnect. The screening service 222 sends a bye message to end the call with the IMS subscriber 202. The screening service 222 sends a 4XX response back to the peering SBC 240 indicating a client failure. The 4xx response is communicated to the SIP peer 242. The call is then ended.

Figure 5:
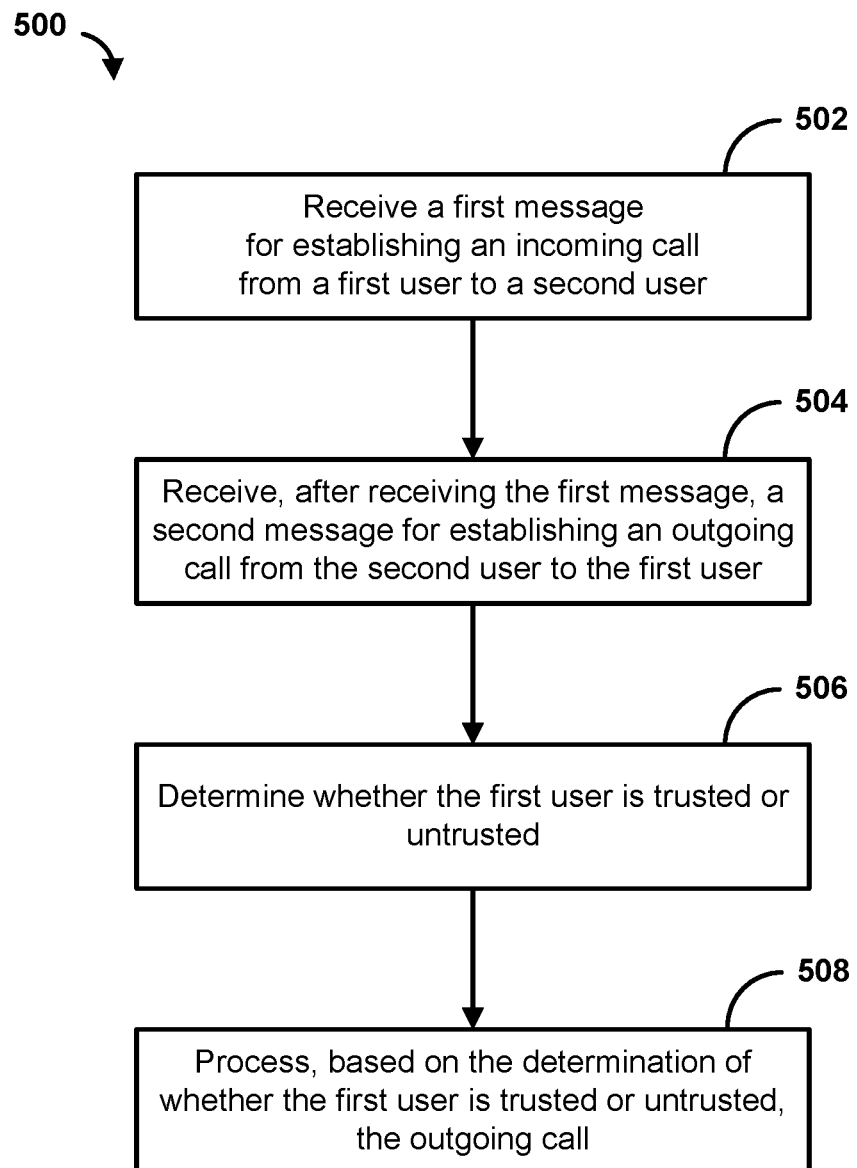
FIG. 5 is a flow diagram illustrating an example method.

FIG. 5 is a flow diagram illustrating an example method. The method 500 may comprise a computer implemented method for providing a service (e.g., a communication service, network service, screening service, filtering service, spam service). A system and/or computing environment, such as the system 100 of FIG. 1 and/or the computing environment of FIG. 9, may be configured to perform the method 500.

At step 502, a first message for establishing an incoming call from a first user to a second user may be received. The first message may comprise a session initiation protocol message, such as a SIP Invite message. The first message may be received by a computing device, such as a routing device, a breakout gateway control function device, and/or the like.

A call duration of the incoming call may be determined. The call duration may be determined based on calculating a difference between session initiation protocol messages and/or signaling. The call duration may satisfy (e.g., be within, below) a first threshold of time. The first threshold of time may be a threshold associated with detecting one-ring scam calls. The first threshold may have a value for detecting calls that are one ring or less in duration. As a few examples, the first threshold may comprise 15 seconds, 10 seconds, 5 seconds, 1 second, 500 milliseconds, 100 milliseconds, 50 milliseconds, and/or any other appropriate amount of time for detecting a one-ring call.

An indication of the first user being untrusted may be determined. The indication of the first user being untrusted may be determined based on a time difference between SIP messages. Screening data may be updated based on receiving the first message. The indication of the first user (e.g., being untrusted) may be added to the screening data. The indication of the first user may be added (e.g., or may be indicated as untrusted) based on using session initiation protocol signaling to detect one or more call durations of incoming calls from the first user satisfying (e.g., being within, below) the first threshold. The first user may be identified in the screening data based on a time difference between a SIP ringing message and a SIP cancel message.

Additional information associated with an indication of the first user in the screening data may be updated. A number of times the first user is detected sending an incoming call may be incremented. The number may be incremented based on receiving the first message and the call duration satisfying (e.g., being within, below) the first threshold. The indication of the first user being untrusted may be based on the number.

At step 504, a second message for establishing an outgoing call from the second user to the first user may be received. The second message may be received after receiving the first message. The outgoing call may be the second user calling the first user back. The second user may see that the first user called in a call log on the device of the second user and press a button to call back the first user.

At step 506, a determination may be made of whether the first user is trusted or untrusted. An indication that the first user is trusted may be determined. A history of calls between the first user and the second user may be accessed. A determination may be made, based on the history of calls, of at least one call having a duration that satisfies one or more thresholds of time (e.g., the first threshold of time, another threshold of time longer than the first threshold). In some scenarios, a user may ring another user but quickly hang up (e.g., of the user has a higher long distance fee than the called user). The user receiving the call may recognize the user and call the user back and have a call of substantial length. This may indicate that the first user is trusted even if the first user's behavior is suspicious.

An indication that the first user is untrusted may be determined. Determining the indication that the first user is untrusted may be based on the screening data. The indication that the first user is untrusted may be based on the first user being associated with one or more incoming calls having call durations that satisfy (e.g., within, below, equal to) the first threshold. The screening data may be accessed. The screening data may be accessed based on a time of receiving the second message after receiving the first message satisfying (e.g., being within) a second threshold of time. The second threshold may be longer than the first threshold. The second threshold may comprise 30 seconds, 1 minute, 5 minutes, 10 minutes, 15 minutes, an hour, and/or any other number appropriate for detecting a callback to a one ring scam (e.g., or other screened scenario). The screening data may comprise a plurality of untrusted users. The first user being in the screening data may indicate that the first user is untrusted. The screening data may be accessed to determine if the screening data comprises an indication of the first user (e.g., indicating the first user is untrusted). The screening data may comprise the indication of the first user.

The determination of whether the first user is trusted or untrusted may be based on a network entity. A network entity associated with routing the second message via an outbound trunk group may be determined. It may be determined, based on the network entity, that the first user is trusted. The network entity may be a trusted network. The network entity may comply with network rules that prevent spamming, spoofing, and/or other suspicious behavior.

The screening data may be accessed based on an association (e.g., in a routing rule) of a network entity (e.g., or trunk group) with the screening data (e.g., comprising the indication of the first user being untrusted). A network entity may comprise a network provider, service provider, organization, and/or the like. The network entity may provide routing information associated with routing calls for the network entity. Any calls received from the network entity (e.g., from a user of the network entity) and/or directed to the network entity (e.g., to a user of the network entity) may be processed using the routing information. The routing information may indicate a preference to use or not to use screening data and/or a screening server. The screening server may be configured to provide an indication of trust levels of a plurality of users, such as the first user. A network entity associated with routing the second message via an outbound trunk group may be determined. The determination of the network entity may be made by determining that a network address (e.g., internet protocol address) of the first user matches (e.g., is within a range of network addresses) of a network entity. A determination may be made to access the screening data (e.g., to determine whether there is an indication of the first user being untrusted). The determination to access the screening data may be made based on an association (e.g., via the routing information) of the screening data with the network entity.

Determining whether the first user is trusted or untrusted may be based on one or more trust rules. The screening data may be accessed based on the one or more trust rules. One or more trust rules associating routing information with corresponding actions may be determined. The one or more trust rules may be determined based on the second message. The one or more trust rules may be determined by a routing device. A first action of the corresponding actions may comprise screening a call using the screening server. A second action of the corresponding actions may comprise allowing the call to be processed without using the screening server. The network entity may specify the trust rules. The network entity may define which conditions trigger processing a call using the screening data, which conditions indicate whether a user is trusted, which conditions indicate a user is untrusted, or a combination thereof.

The screening data may be periodically updated. The indication of the first user may be removed from the screening data if a number of incoming calls from the first user that satisfy (e.g., are below) the first threshold satisfies (e.g., is below) a third threshold number of calls for a time period. Determining the first user is trusted may be based on the screening data not having (e.g., or no longer having) the indication of the first user. In some scenarios, the indication of the first user may be added to candidate screening data.

The candidate screening data may only be added to the screening data if the candidate screening data meets one or more conditions, such as having the number of incoming calls (e.g., with call durations below the first threshold) from the first user be above the third threshold number of calls for a time period. Removing the indication of the first user from the screening data may comprise removing the indication of the first user from one or more of the screening data or candidate screening data (e.g., or moving from the screening data to the candidate screening data).

At step 508, the outgoing call may be processed. The outgoing call may be processed based on the determination of whether the first user is trusted or untrusted. Processing the call may comprise routing the second message, discarding the second message, forwarding the second message, generating a new message based on the second message, establishing a communication session based on the second message, or a combination thereof. The second message may be sent (e.g., if the first user is determined to be untrusted) to a screening server configured for providing one or more notifications to the second user. The second message may be sent (e.g., if the first user is determined to be trusted) to the first user.

The second user may be caused to receive an indication of a trust level associated with the first user. The second user may be caused to receive the indication of the trust level based on the indication that the first user is untrusted. The second user may be caused to receive the indication of the trust level before sending the second message (e.g., copy of the second message) to the first user. The second message may be sent. The second message may be sent to a screening server. The second message may be sent based on an indication of the first user in the screening data. The second user may be caused to receive the indication of the trust level of the first user via a communication session with the screening server. The screening server may establish the communication session with the second user to indicate to the second user a trust level associated with the first user. The communication session may comprise a session initiation protocol based interactive voice response session providing an audible indication of the trust level and allowing the second user to indicate whether to proceed with or end the incoming call. If the user indicates to proceed with the call, then the second message may be sent (e.g., from the screening server, or other server) to the first user (e.g., or a device, server associated with the first user).

Figure 6:
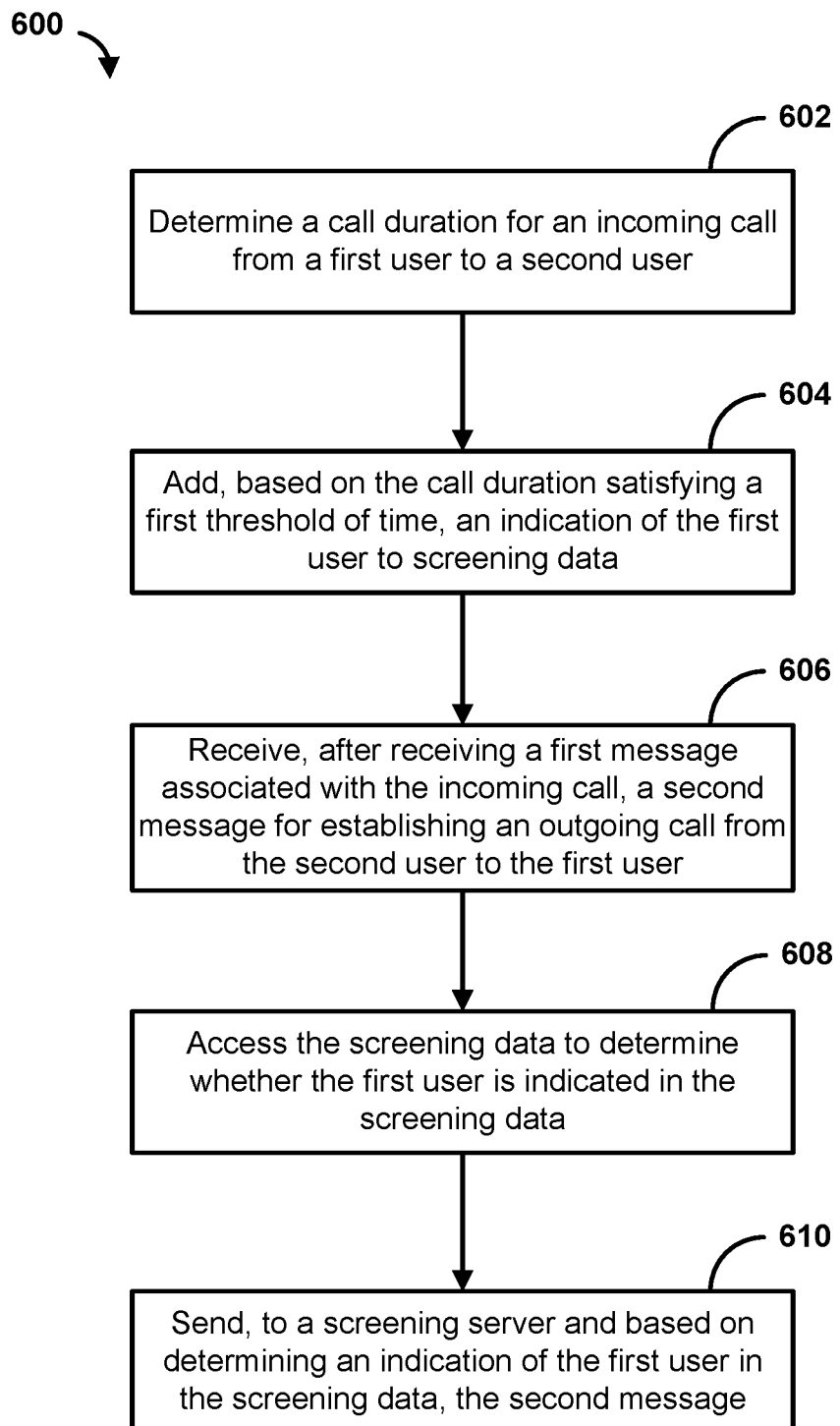
FIG. 6 is a flow diagram illustrating an example method.

FIG. 6 is a flow diagram illustrating an example method. The method 600 may comprise a computer implemented method for providing a service (e.g., a communication service, network service, screening service, filtering service, spam service). A system and/or computing environment, such as the system 100 of FIG. 1 and/or the computing environment of FIG. 9, may be configured to perform the method 600.

At step 602, a call duration for an incoming call from a first user to a second user may be determined. One or more first messages associated with the incoming call may be received. The one or more first messages may comprise a session initiation protocol message, such as a SIP Invite message, a SIP ringing message, a SIP cancel message, and/or the like. The one or more first messages may be received by a computing device, such as a routing device, a breakout gateway control function device, and/or the like. The call duration may be determined based on a time difference between session initiation protocol signaling (e.g., between two SIP messages). Determining the call duration may comprise determining a time difference between a SIP ringing message and a SIP cancel message.

At step 604, an indication of the first user may be added to screening data. The screening data may comprise a plurality of untrusted users. The indication of the first user may be added to the screening data based on the call duration satisfying (e.g., below or equal to) a first threshold of time. The first threshold of time may be a threshold associated with detecting one-ring scam calls. The first threshold may have a value for detecting calls that are one ring or less in duration. As a few examples, the first threshold may comprise 15 seconds, 10 seconds, 5 seconds, 1 second, 500 milliseconds, 100 milliseconds, 50 milliseconds, and/or any other appropriate amount of time for detecting a one-ring call.

Additional information associated with an indication of the first user in the screening data may be updated. An indication of a number of times the first user is detected sending an incoming call (e.g., having a call duration below the first threshold) may be incremented. The number may be incremented based on detecting an additional incoming call between the first user and an additional user.

At step 606, a second message for establishing an outgoing call from the second user to the first user may be received. The second message may be received after receiving the one or more first messages associated with the incoming call. The outgoing call may be the second user calling the first user back. The second user may see that the first user called in a call log on the device of the second user.

At step 608, the screening data may be accessed to determine whether the first user is indicated in the screening data. The screening data may be accessed based on the second message occurring satisfying (e.g., being within, below, equal to) a second threshold of time after the first message. The second threshold may be longer than the first threshold. The second threshold may comprise 30 seconds, 1 minute, 5 minutes, 10 minutes, 15 minutes, an hour, and/or any other number appropriate for detecting a callback to a one ring scam (e.g., or other screened scenario).

The screening data may be accessed based on an association of a network entity with the screening data. A network entity may comprise a network provider, service provider, organization, and/or the like. The network entity may provide routing information associated with routing calls for the network entity. Any calls received from the network entity (e.g., from a user of the network entity) and/or directed to the network entity (e.g., to a user of the network entity) may be processed using the routing information. The routing information may indicate a preference to use or not to use screening data and/or a screening server. A network entity associated with routing the second message via an outbound trunk group may be determined. A determination may be made to access the screening data. The determination to access the screening data may be based on an association (e.g., via the routing information) of the screening data with the network entity.

The screening data may be periodically updated. The indication of the first user may be removed from the screening data if a number of calls from the first user that have a call duration that satisfies (e.g., is below, equal to) the first threshold of time satisfies (e.g., is below, equal to) a third threshold number of calls for a time period. In some scenarios, the indication of the first user may be added to candidate screening data. The candidate screening data may only be added to the screening data if the candidate screening data meets one or more conditions, such as having the number of incoming calls (e.g., with call durations below the first threshold) from the first user be above the third threshold number of calls for a time period. Removing the indication of the first user from the screening data may comprise removing the indication of the first user from one or more of the screening data or candidate screening data (e.g., or moving from the screening data to the candidate screening data).

One or more trust rules associating routing information with corresponding actions may be determined. The one or more trust rules may be determined by a routing device. The one or more trust rules may be determined based on the second message. A first action of the corresponding actions may comprise screening a call using the screening server. A second action of the corresponding actions may comprise allowing the call to be processed without using the screening server.

At step 610, the second message may be sent to the screening server. The second message may be sent to the screening server based on determining an indication of the first user in the screening data. The screening server may establish a communication session with the second user to indicate to the second user a trust level associated with the first user. The communication session may comprise a session initiation protocol based interactive voice response session providing an audible indication of the trust level and allowing the second user to indicate whether to proceed with or end the incoming call.

Figure 7:
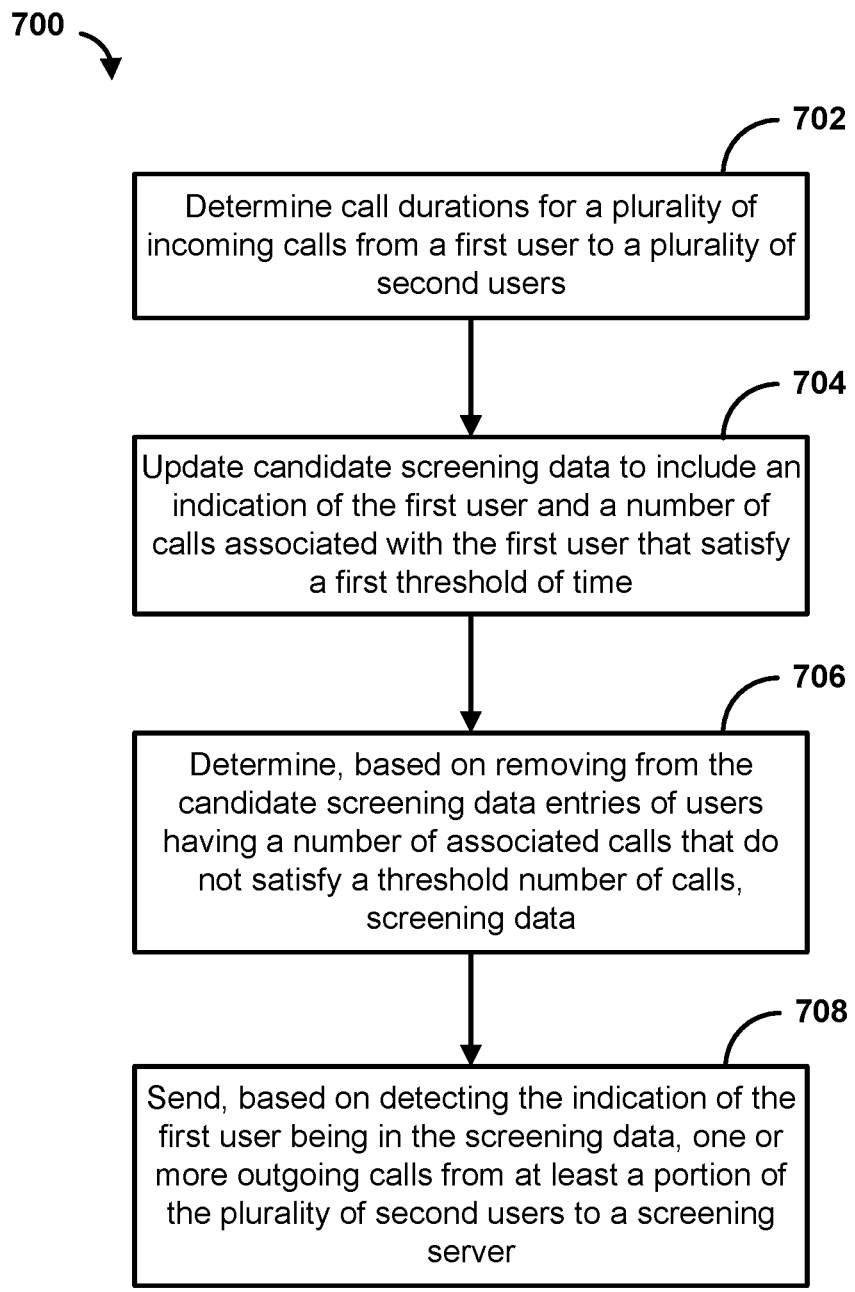
FIG. 7 is a flow diagram illustrating an example method.

FIG. 7 is a flow diagram illustrating an example method. The method 700 may comprise a computer implemented method for providing a service (e.g., a communication service, network service, screening service, filtering service, spam service). A system and/or computing environment, such as the system 100 of FIG. 1 and/or the computing environment of FIG. 9, may be configured to perform the method 700.

At step 702, call durations for a plurality of incoming calls from a first user to a plurality of second users may be determined. The call durations may be determined based on a time difference between session initiation protocol signaling (e.g., for a specific incoming call). Determining the call durations may comprise determining a time difference between a SIP ringing message and a SIP cancel message.

At step 704, candidate screening data may be updated to include an indication of the first user. The candidate screening data may be updated to include a number of calls associated with the first user that satisfy (e.g., are below, equal to) the first threshold of time. The candidate screening data may be updated based on at least one of the call durations satisfying a first threshold of time. The first threshold of time may be a threshold associated with detecting one-ring scam calls. The first threshold may have a value for detecting calls that are one ring or less in duration. As a few examples, the first threshold may comprise 15 seconds, 10 seconds, 5 seconds, 1 second, 500 milliseconds, 100 milliseconds, 50 milliseconds, and/or any other appropriate amount of time for detecting a one-ring call.

At step 706, screening data may be determined. The screening data may be determined based on removing from the candidate screening data entries of users having a number of associated calls that satisfy (e.g., below, equal to) a threshold number of calls. Determining the screening data may comprise combining at least a portion of the candidate screening data with one or more additional sources of screening data. The portion of the candidate screening data may comprise entries of the candidate screening data remaining after removing from the candidate screening data.

The additional sources of screening data may comprise data from other scam and/or filter lists, processes, and/or the like.

The screening data may be determined based on input from one or more network entities. A network entity may comprise a network provider, service provider, organization, and/or the like. The network entity may provide routing information associated with routing calls for the network entity. Any calls received from the network entity (e.g., from a user of the network entity) and/or directed to the network entity (e.g., to a user of the network entity) may be processed using the routing information. The routing information may indicate a preference to use or not to use screening data and/or a screening server. The network entity may provide a list of users and/or other filtering criteria that may be added to the screening data. This custom screening data may only be applied to calls associated with the network entity. An association of a network entity with a network address (e.g., internet protocol address), range of addresses, domain, and/or the like may be stored. The association may be used to match calls from users with corresponding network entities. A network entity may be associated with a trunk group. The trunk group may be associated with routing information, a preference to use screening data, a preference to use screening data, and/or the like. If a call is matched to a trunk group the corresponding preference may be used to route the call.

At step 708, one or more outgoing calls may be sent from at least a portion of the plurality of second users to a screening server. The outgoing call may be the portion of the plurality of second users calling the first user back. The portion of the plurality of second users may see that the first user called in a call log on the devices of the portion of the plurality of second users. The one or more outgoing calls may be sent based on detecting the indication of the first user being in the screening data. The screening server may establish a communication session with the second user to indicate to the second user a trust level associated with the first user. Sending the one or more outgoing calls to the screening server may be based on the one or more outgoing calls occurring at a time after corresponding calls from the first user satisfying (e.g., being below, equal to) a second threshold of time. The second threshold may be longer than the first threshold. The second threshold may comprise 30 seconds, 1 minute, 5 minutes, 10 minutes, 15 minutes, an hour, and/or any other number appropriate for detecting a callback to a one ring scam (e.g., or other screened scenario).

A network entity associated with routing the one or more outgoing calls via an outbound trunk group may be determined. A determination may be made to process the one or more outgoing calls using the screening data. The determination may be made based on an association of the screening data with the network entity. One or more trust rules associating routing information with corresponding actions may be determined. The one or more trust rules may be determined based on the one or more outgoing calls. A first action of the corresponding actions may comprise screening a call using the screening server. A second action of the corresponding actions may comprise allowing the call to be processed without using the screening server.

Figure 8:
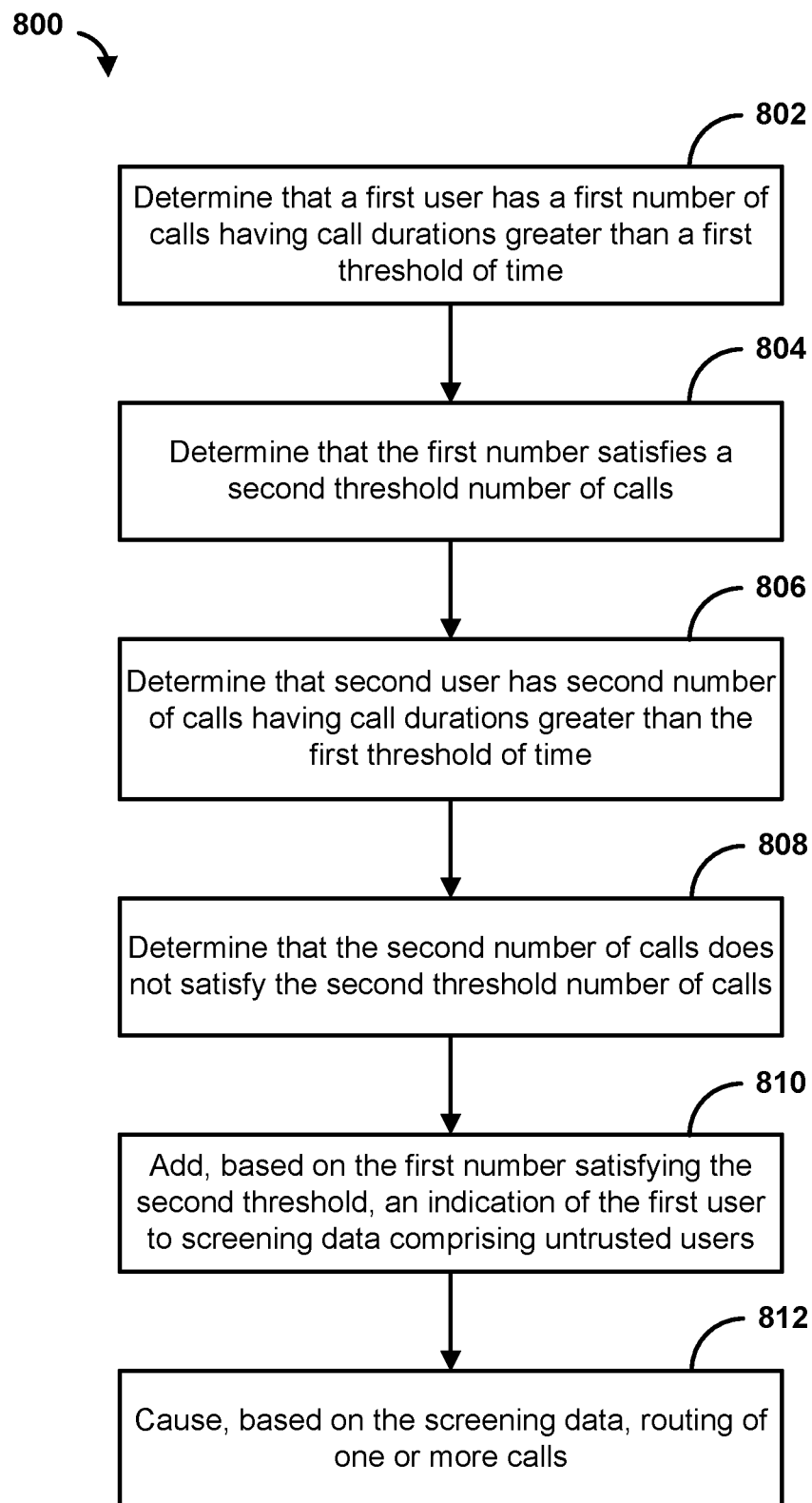
FIG. 8 is a flow diagram illustrating an example method.

FIG. 8 is a flow diagram illustrating an example method. The method 800 may comprise a computer implemented method for providing a service (e.g., a communication service, network service, screening service, filtering service, spam service). A system and/or computing environment, such as the system 100 of FIG. 1 and/or the computing environment of FIG. 9, may be configured to perform the method 800.

At step 802, a determination may be made that a first user has a first number of calls having call durations greater than a first threshold of time. Determining that the first user has the first number of calls having call durations greater than a first threshold of time may comprise determining the call durations for calls associated with the first user based on a time difference between a session initiation protocol SIP messages. The SIP messages may comprise a SIP ringing message and a SIP cancel message.

At step 804, a determination may be made that the first number satisfies (e.g., is above, or is equal to or above) a second threshold number of calls. At step 806, a determination may be made that second user has second number of calls having call durations greater than the first threshold of time. Determining that the second user has the second number of calls having call durations greater than a first threshold of time may comprise determining the call durations for calls associated with the first user based on a time difference between session initiation protocol SIP messages. The SIP messages may comprise a SIP ringing message and a SIP cancel message.

At step 808, a determination may be made that the second number of calls does not satisfy (e.g., is below, or is equal to or below) the second threshold number of calls. At step 810, an indication of the first user may be added to screening data comprising untrusted users. The indication of the first user may be added to the screening data based on the first number satisfying the second threshold. The second user may not be added to the screening data based on the second number not satisfying the second threshold.

The indication of the first user and an indication of the second user may be added to candidate screening data. The indication of the first user may be moved from the candidate screening data to the screening data based on the first number of users satisfying the second threshold. The indication of the second user may not be moved from the candidate screening data to the screening data based on the second number of calls not satisfying the second threshold.

At step 812, routing of one or more calls may be caused. The routing of the one or more calls may be caused at least on part based on the screening data. Calls associated with the first user may receive an indication of a trust level associated with the first user. The indication of the trust level associated with the first user may be provided by a screening server. The calls associated with the first user may be routed, based on the indication of the first user being in the screening data, to the screening server. Calls associated with the second user may be routed without indicating a trust level associated with the second user. Calls associated with the second user may be routed without using the screening server.

Causing routing of one or more calls may comprise determining, based on the one or more calls, one or more trust rules associating routing information with corresponding actions. A first action of the corresponding actions may comprise screening a call using the screening server. A second action of the corresponding actions may comprise allowing the call to be processed without using the screening server.

Causing routing of the one or more calls may comprise determining a network entity associated with routing the one or more outgoing calls via an outbound trunk group. A determination may be made to process the one or more outgoing calls using the screening data. The determined to process the one or more outgoing calls using the screening data may be made based on an association of the screening data with the network entity.

The calls associated with the first user may receive the indication of the trust level associated with the first user based on the one or more calls occurring in a manner that satisfies (e.g., is below, within) a third threshold of time after corresponding calls from the first user (e.g., the time from the first user placing the call until the originator of the call attempts to return call of the first user). If the one or more calls satisfy the third threshold of time, then the one or more calls may be routed to the screening server. The screening server may provide the indication of the trust level associated with the first user via a communication session between the screening server and the originator of the call.

Figure 9:
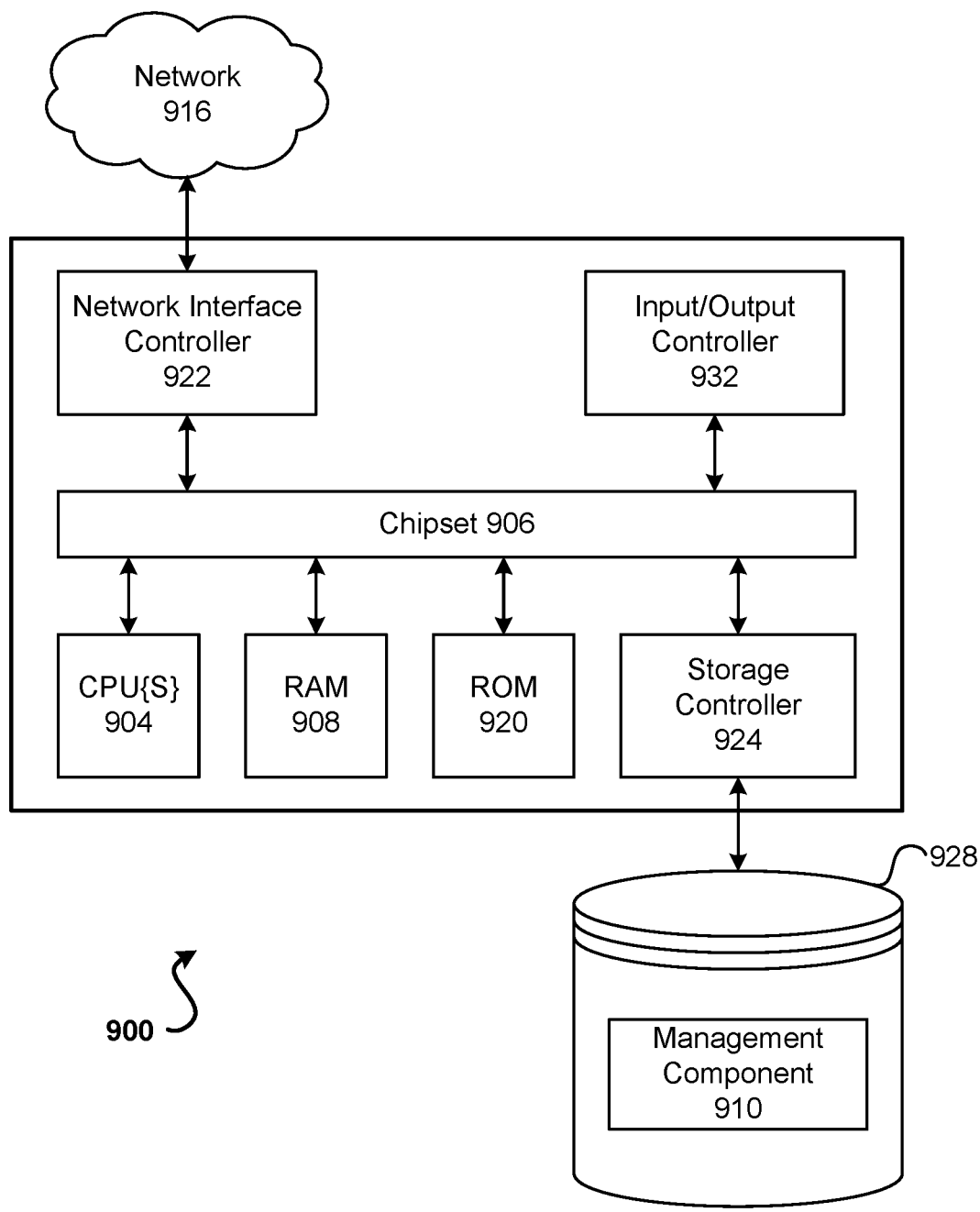
FIG. 9 is a block diagram illustrating an example computing device.

FIG. 9 shows a computing device that may be used in various aspects, such as the servers, services modules, and/or devices depicted in FIG. 1, FIG. 2A, and FIG. 2B. With regard to the example devices of FIG. 1, FIG. 2A, and FIG. 2B, the analysis service 102, the routing service 104, the screening service 106, the network 108, the first user device 110, the network device 112, the second user device 114, the BGCF 212, the routing DB primary 210, the analytics service 206, the screening service 222, the vIRDB-EB 245, and many other elements depicted may each be implemented in an instance of a computing device 900 of FIG. 9. The computing device shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement any of the systems and the methods described in relation to FIG. 1, FIG. 2A, FIG. 2B, FIG. 3A, FIG. 3B, FIG. 4A, FIG. 4B, FIG. 4C, FIG. 4D, FIG. 4E, FIG. 4F, FIG. 5, FIG. 6, FIG. 7, and FIG. 8. The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may further provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described in relation to FIG. 1, FIG. 2A, FIG. 2B, FIG. 3A, FIG. 3B, FIG. 4A, FIG. 4B, FIG. 4C, FIG. 4D, FIG. 4E, FIG. 4F, FIG. 5, FIG. 6, FIG. 7, and FIG. 8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving a first message for establishing an incoming call from a first user to a second user, wherein the incoming call has a call duration that satisfies a first threshold of time;
receiving, after receiving the first message, a second message for establishing an outgoing call from the second user to the first user;
determining, based on a time between receiving the second message and receiving the first message satisfying a second threshold of time, an indication that the first user is untrusted, wherein the indication is based on the first user being associated with one or more incoming calls having call durations within the first threshold; and
causing, based on the indication that the first user is untrusted, and before sending the second message to the first user, the second user to receive an indication of a trust level associated with the first user.

2. The method of claim 1, wherein the indication of the first user being untrusted is based on a time difference between a SIP ringing message and a SIP cancel message.

3. The method of claim 1, further comprising:
determining a network entity associated with routing the second message via an outbound trunk group; and
determining, based on an association of the network entity with screening data comprising the indication of the first user being untrusted, to access the screening data to determine the indication of the first user being untrusted.

4. The method of claim 1, further comprising removing the indication of the first user from screening data if a number of incoming calls from the first user that satisfy the first threshold does not satisfy a third threshold number of calls for a time period.

5. The method of claim 1, further comprising:
determining, based on calculating a difference between session initiation protocol messages, the call duration of the incoming call; and
incrementing, based on receiving the first message and the call duration satisfying the first threshold, a number of times the first user is detected sending an incoming call.

6. The method of claim 1, further comprising determining, by a routing device and based on the second message, one or more trust rules associating routing information with corresponding actions, wherein a first action of the corresponding actions comprises screening a call using a screening server configured to provide the indication of the trust level and a second action of the corresponding actions comprises allowing the call to be processed without using the screening server.

7. The method of claim 1, wherein the second user is caused to receive the indication of the trust level of the first user via a communication session with a screening server, and wherein the communication session comprises a session initiation protocol based interactive voice response session providing an audible indication of the trust level and allowing the second user to indicate whether to proceed with or end the incoming call.

8. A method comprising:
receiving a first message for establishing an incoming call from a first user to a second user, wherein the incoming call has a call duration that satisfies a first threshold of time;
receiving, after receiving the first message, a second message for establishing an outgoing call from the second user to the first user;
determining, based on a time between receiving the second message and receiving the first message satisfying a second threshold of time, whether the first user is trusted or untrusted; and
causing, based on determining that the first user is trusted, the second message to be sent to the first user.

9. The method of claim 8, wherein the call duration is based on a time difference between a SIP ringing message and a SIP cancel message.

10. The method of claim 8, wherein determining whether the first user is trusted or untrusted comprises:
determining a network entity associated with routing the second message via an outbound trunk group; and
determining, based on the network entity, that the first user is trusted.

11. The method of claim 8, further comprising removing an indication of the first user from screening data based on a number of incoming calls from the first user that satisfy the first threshold not satisfying a third threshold number of calls for a time period, wherein the determining the first user is trusted is based on the screening data not having the indication of the first user.

12. The method of claim 8, further comprising:
determining, based on calculating a difference between session initiation protocol messages, the call duration of the incoming call; and
incrementing, based on receiving the first message and the call duration satisfying the first threshold, a number of times the first user is detected sending an incoming call.

13. The method of claim 8, wherein determining whether the first user is trusted or untrusted comprises determining, by a routing device and based on the second message, one or more trust rules associating routing information with corresponding actions, wherein a first action of the corresponding actions comprises screening a call using a screening server configured to provide an indication of a trust level of the first user and a second action of the corresponding actions comprises allowing the call to be processed without using the screening server.

14. The method of claim 8, wherein determining whether the first user is trusted or untrusted comprises accessing a history of calls between the first user and the second user and determining, based on the history of calls, at least one call having a duration above one or more thresholds of time.

15. A method comprising:
determining that a first user has a first number of calls having call durations greater than a first threshold of time;
determining that the first number satisfies a second threshold number of calls;
determining that a second user has a second number of calls having call durations greater than the first threshold of time;
determining that the second number of calls does not satisfy the second threshold number of calls;
adding, based on the first number satisfying the second threshold, an indication of the first user to screening data comprising untrusted users, wherein the second user is not added to the screening data based on the second number not satisfying the second threshold; and
causing, based on the screening data, routing of one or more calls, wherein calls associated with the first user receive an indication of a trust level associated with the first user, and wherein calls associated with the second user are routed without indicating a trust level associated with the second user.

16. The method of claim 15, wherein determining that the first user has the first number of calls having call durations greater than the first threshold of time comprises determining the call durations for calls associated with the first user based on a time difference between a session initiation protocol (SIP) ringing message and a SIP cancel message.

17. The method of claim 15, wherein causing routing of the one or more calls comprises:
determining a network entity associated with routing the one or more calls via an outbound trunk group; and
determining, based on an association of the screening data with the network entity, to process the one or more calls using the screening data.

18. The method of claim 15, wherein causing routing of one or more calls comprises determining, based on the one or more calls, one or more trust rules associating routing information with corresponding actions, wherein a first action of the corresponding actions comprises screening a call using a screening server and a second action of the corresponding actions comprises allowing the call to be processed without using the screening server.

19. The method of claim 15, further comprising adding the indication of the first user and an indication of the second user to candidate screening data, wherein the indication of the first user is moved from the candidate screening data to the screening data based on the first number of users satisfying the second threshold, and wherein the indication of the second user is not moved from the candidate screening data to the screening data based on the second number of calls not satisfying the second threshold.

20. The method of claim 15, wherein the calls associated with the first user receive the indication of the trust level associated with the first user based on the corresponding call satisfying a third threshold of time after corresponding calls from the first user.

* * * * *